United States Patent
Osenbach et al.

(10) Patent No.: US 9,784,933 B2
(45) Date of Patent: Oct. 10, 2017

(54) PHOTONIC INTEGRATED CIRCUIT (PIC) AND SILICON PHOTONICS (SIP) CIRCUITRY DEVICE

(71) Applicant: Infinera Corporation, Sunnyvale, CA (US)

(72) Inventors: John W. Osenbach, Kutztown, PA (US); Timothy Butrie, Hellertown, PA (US); Fred A. Kish, Jr., Palo Alto, CA (US); Michael Reffle, Center Valley, PA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/689,571

(22) Filed: Apr. 17, 2015

(65) Prior Publication Data

US 2016/0178861 A1    Jun. 23, 2016

Related U.S. Application Data

(60) Provisional application No. 62/094,021, filed on Dec. 18, 2014.

(51) Int. Cl.
*G02B 6/42* (2006.01)
*G02B 6/12* (2006.01)
(Continued)

(52) U.S. Cl.
CPC ....... *G02B 6/4251* (2013.01); *G02B 6/12004* (2013.01); *G02B 6/13* (2013.01);
(Continued)

(58) Field of Classification Search
None
See application file for complete search history.

(56) References Cited

U.S. PATENT DOCUMENTS 5,054,870 A * 10/1991 Losch .................. G02B 6/43
                                              250/227.24
5,521,992 A *  5/1996 Chun .................. G02B 6/1221
                                              257/666

(Continued)

FOREIGN PATENT DOCUMENTS

JP      H02 208604 A      8/1990

OTHER PUBLICATIONS

English language Abstract of JP H02 208604 A.
Extended Search Report in European Patent Application No. EP15201033.6.

*Primary Examiner* — Mike Stahl
(74) *Attorney, Agent, or Firm* — David L. Soltz

(57) ABSTRACT

A device may include a first substrate. The device may include an optical source. The optical source may generate light when a voltage or current is applied to the optical source. The optical source may be being provided on a first region of the first substrate. The device may include a second substrate. A second region of the second substrate may form a cavity with the first region of the first substrate. The optical source may extend into the cavity. The device may include an optical interconnect. The optical interconnect may be provided on or in the second substrate and outside the cavity. The optical interconnect may be configured to receive the light from the optical source.

31 Claims, 29 Drawing Sheets

(51) Int. Cl.
*G02B 6/13* (2006.01)
*G02B 6/136* (2006.01)

(52) U.S. Cl.
CPC ......... *G02B 6/4219* (2013.01); *G02B 6/4257* (2013.01); *G02B 6/4273* (2013.01); *G02B 6/136* (2013.01); *G02B 6/423* (2013.01); *G02B 6/4215* (2013.01); *G02B 6/4274* (2013.01); *G02B 2006/12035* (2013.01); *G02B 2006/12061* (2013.01); *G02B 2006/12078* (2013.01)

(56) References Cited

U.S. PATENT DOCUMENTS

| | | | | |
|---|---|---|---|---|
| 5,780,875 A * | 7/1998 | Tsuji | ................ | G02B 6/4224 257/81 |
| 6,074,104 A * | 6/2000 | Higashikawa | ....... | G02B 6/4248 385/88 |
| 6,786,654 B2 * | 9/2004 | Kilian | ................ | G02B 6/4202 385/94 |
| 7,003,192 B2 * | 2/2006 | Blair | ................ | G02B 6/3582 385/17 |
| 7,239,767 B2 * | 7/2007 | Kim | ................ | G02B 6/42 385/14 |
| 7,249,896 B2 * | 7/2007 | Chen | ................ | H01L 27/14618 257/E25.032 |
| 7,306,378 B2 * | 12/2007 | Alduino | ............... | G02B 6/4214 385/14 |
| 7,433,554 B2 * | 10/2008 | Warashina | ............... | G02B 6/43 385/132 |
| 2002/0064345 A1 * | 5/2002 | Kikuchi | ............. | G02B 6/12004 385/50 |
| 2003/0103712 A1 * | 6/2003 | Glebov | .............. | G02B 6/12004 385/14 |
| 2003/0215194 A1 * | 11/2003 | Kuhmann | ............... | G02B 6/423 385/92 |
| 2004/0052480 A1 * | 3/2004 | Benzoni | ............... | G02B 6/4279 385/94 |
| 2006/0093002 A1 | 5/2006 | Park et al. | | |
| 2007/0280585 A1 | 12/2007 | Warashina et al. | | |
| 2008/0013959 A1 * | 1/2008 | Ishigami | ............... | G02B 6/4204 398/135 |
| 2010/0061683 A1 * | 3/2010 | Sasaki | ................ | G02B 6/4214 385/88 |
| 2012/0051688 A1 * | 3/2012 | Pitwon | .................... | H01S 3/091 385/14 |
| 2014/0133864 A1 * | 5/2014 | Asghari | ................ | G02B 6/423 398/141 |
| 2014/0241733 A1 | 8/2014 | Moriyama et al. | | |
| 2014/0286605 A1 * | 9/2014 | Lee | .......................... | G02B 6/12 385/14 |

* cited by examiner

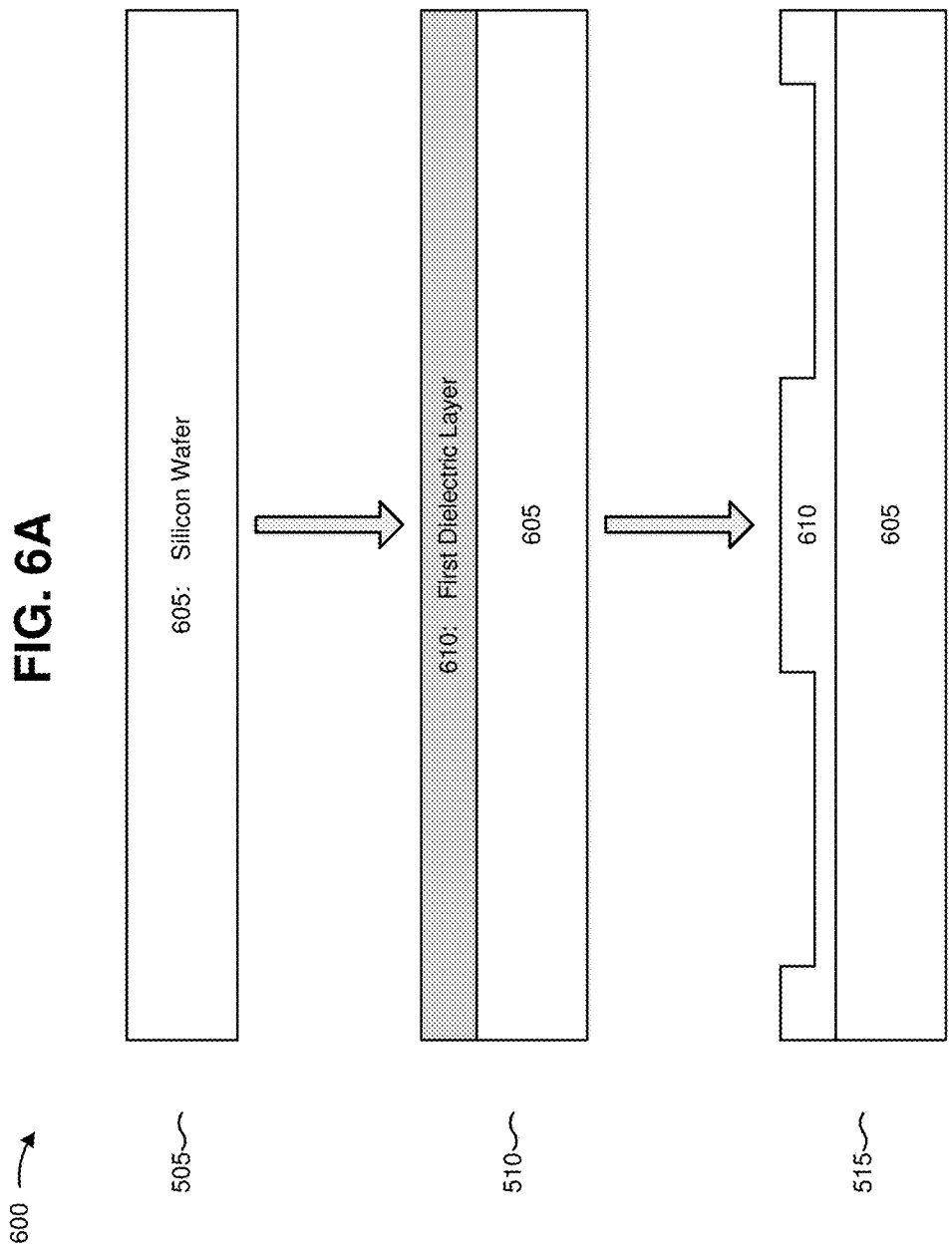

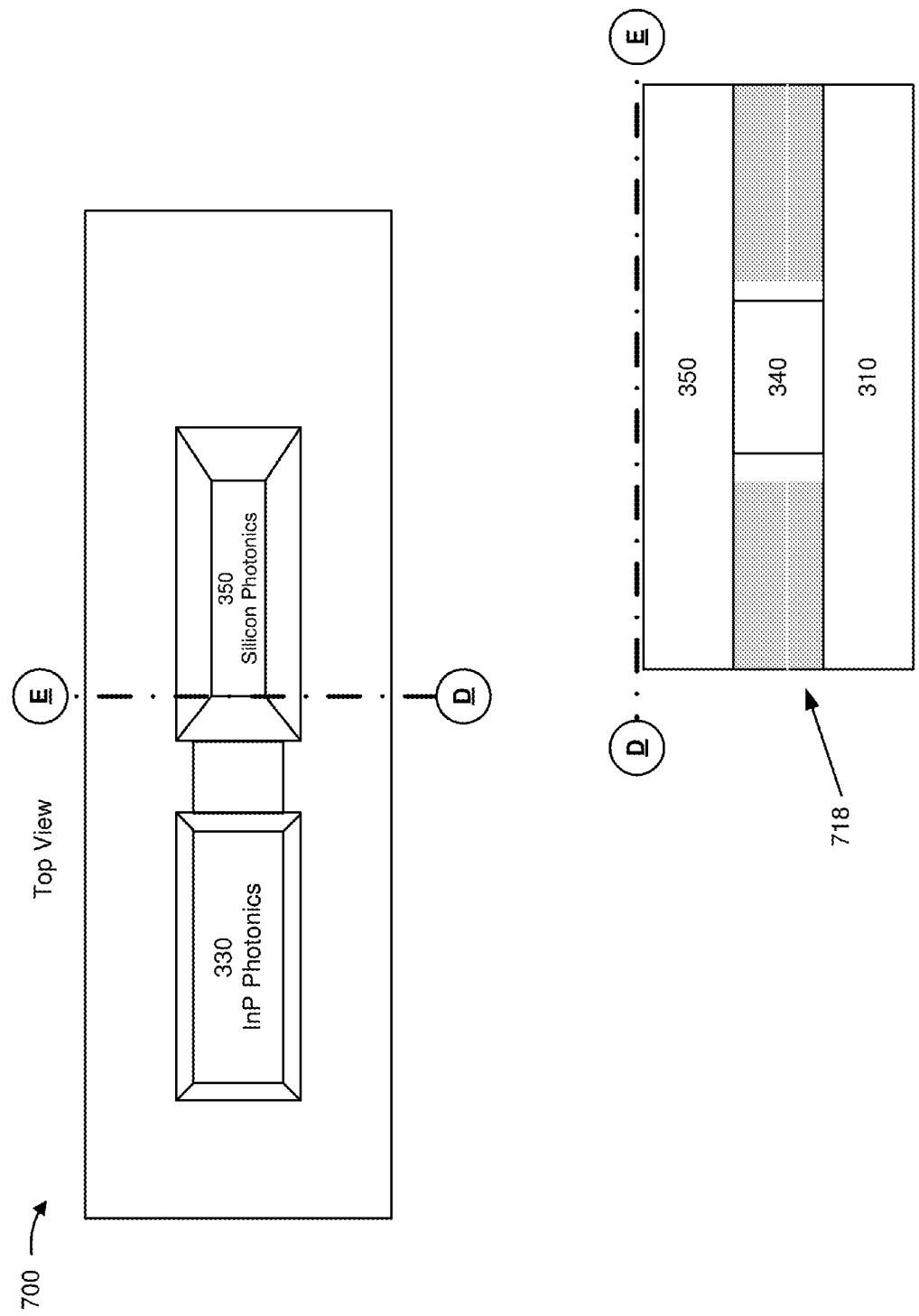

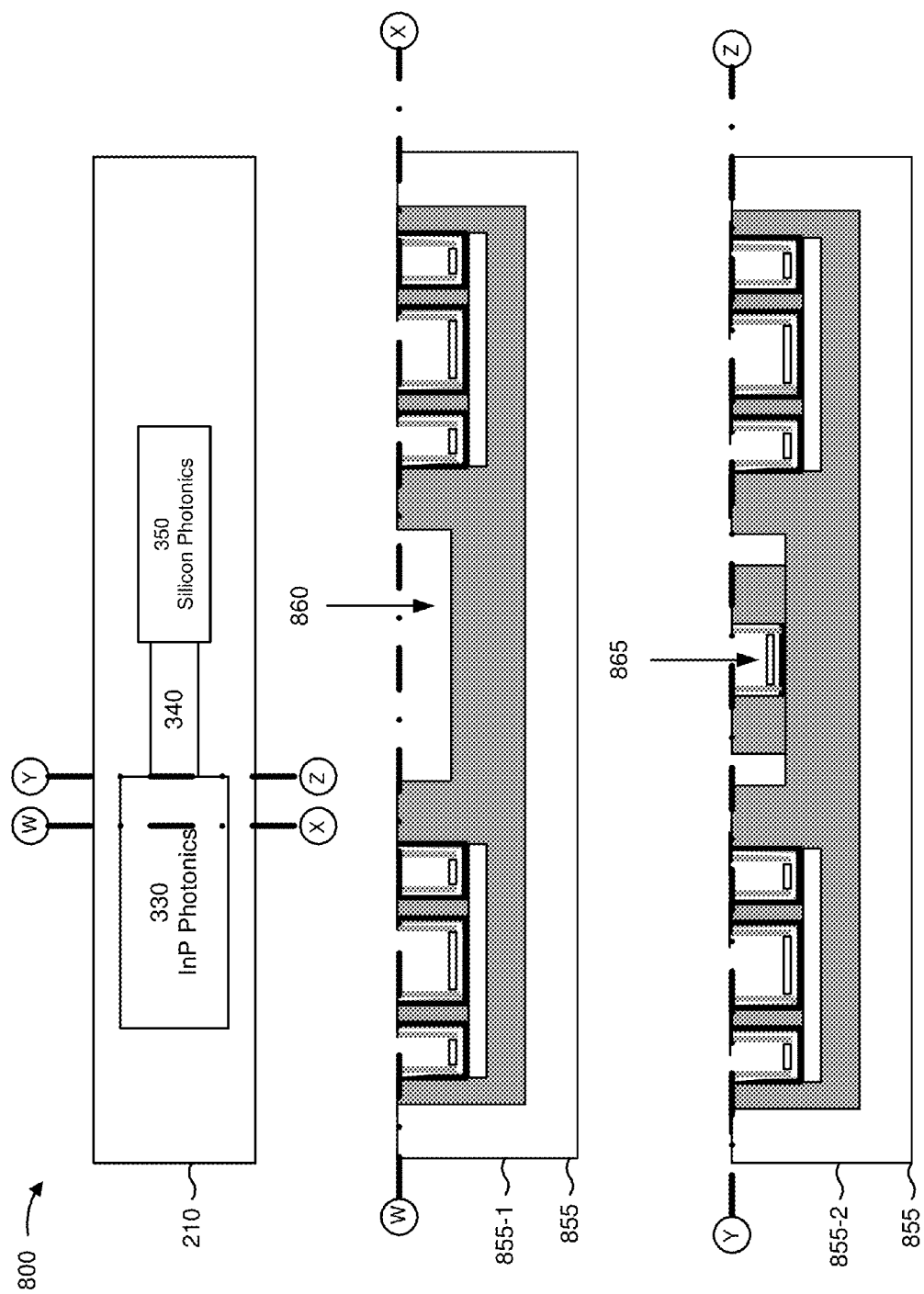

PHOTONIC INTEGRATED CIRCUIT (PIC) AND SILICON PHOTONICS (SIP) CIRCUITRY DEVICE

RELATED APPLICATION

This application claims priority under 35 U.S.C. §119 to U.S. Provisional Patent Application No. 62/094,021, filed on Dec. 18, 2014, the content of which is incorporated by reference herein in its entirety.

BACKGROUND

A photonic integrated circuit (PIC) may integrate one or more optical devices onto a common substrate. For example, a PIC may include a laser, a modulator, an optical combining element, an arrayed waveguide grating (AWG), a power combiner, or the like. Silicon photonics (SIP) circuitry may include one or more optical devices utilized for manipulating an optical signal received from a laser. For example, SIP circuitry may include an optical combiner, an optical splitter, a modulator, or the like.

SUMMARY

According to some possible implementations, a device may include a first substrate. The device may include an optical source. The optical source may generate light when a voltage or current is applied to the optical source. The optical source may be being provided on a first region of the first substrate. The device may include a second substrate. A second region of the second substrate may form a cavity with the first region of the first substrate. The optical source may extend into the cavity. The device may include an optical interconnect. The optical interconnect may be provided on or in the second substrate and outside the cavity. The optical interconnect may be configured to receive the light from the optical source.

According to some possible implementations, a device may include a first substrate. The first substrate may include one or more waveguides for coupling a first set of optical devices to a second set of optical devices. The device may include a second substrate. The second substrate may be configured to attach to the first substrate and form an environmentally sealed cavity between the first substrate and the second substrate. The second substrate may be configured to mount the first set of optical devices. The device may include a third substrate. The third substrate may be configured to attach to the first substrate. The third substrate may be configured to mount the second set of optical devices.

According to some possible implementations, a device may include a first substrate including a cavity in a surface of the first substrate. The surface of the first substrate may be configured to receive a photonic integrated circuit (PIC) including a second substrate. The surface of the first substrate may be configured to receive silicon photonics (SIP) circuitry. The device may include a sealing structure associated with the first substrate. The sealing structure may be configured to facilitate an environmental seal of the cavity with a surface of the second substrate. The sealing structure may include one or more openings associated with facilitating an optical connection of the PIC with the SIP circuitry.

According to some possible implementations, a device may include a substrate including a cavity in a surface of the substrate. The cavity may be environmentally sealed. The cavity may be included in a first region of the surface. The first region of the surface may be configured to receive a first photonic integrated circuit (PIC). A second region of the surface may be configured to receive a second PIC.

BRIEF DESCRIPTION OF THE DRAWINGS

FIGS. 6A-6G are diagrams of an example implementation relating to the example process shown in FIGS. 5A-5C;

FIGS. 7A-7E are diagrams of an example implementation relating to the example process shown in FIGS. 5A-5C; and FIGS. 8A-8J are diagrams of an example implementation relating to the example process shown in FIGS. 5A-5C.

DETAILED DESCRIPTION

Figure 1:
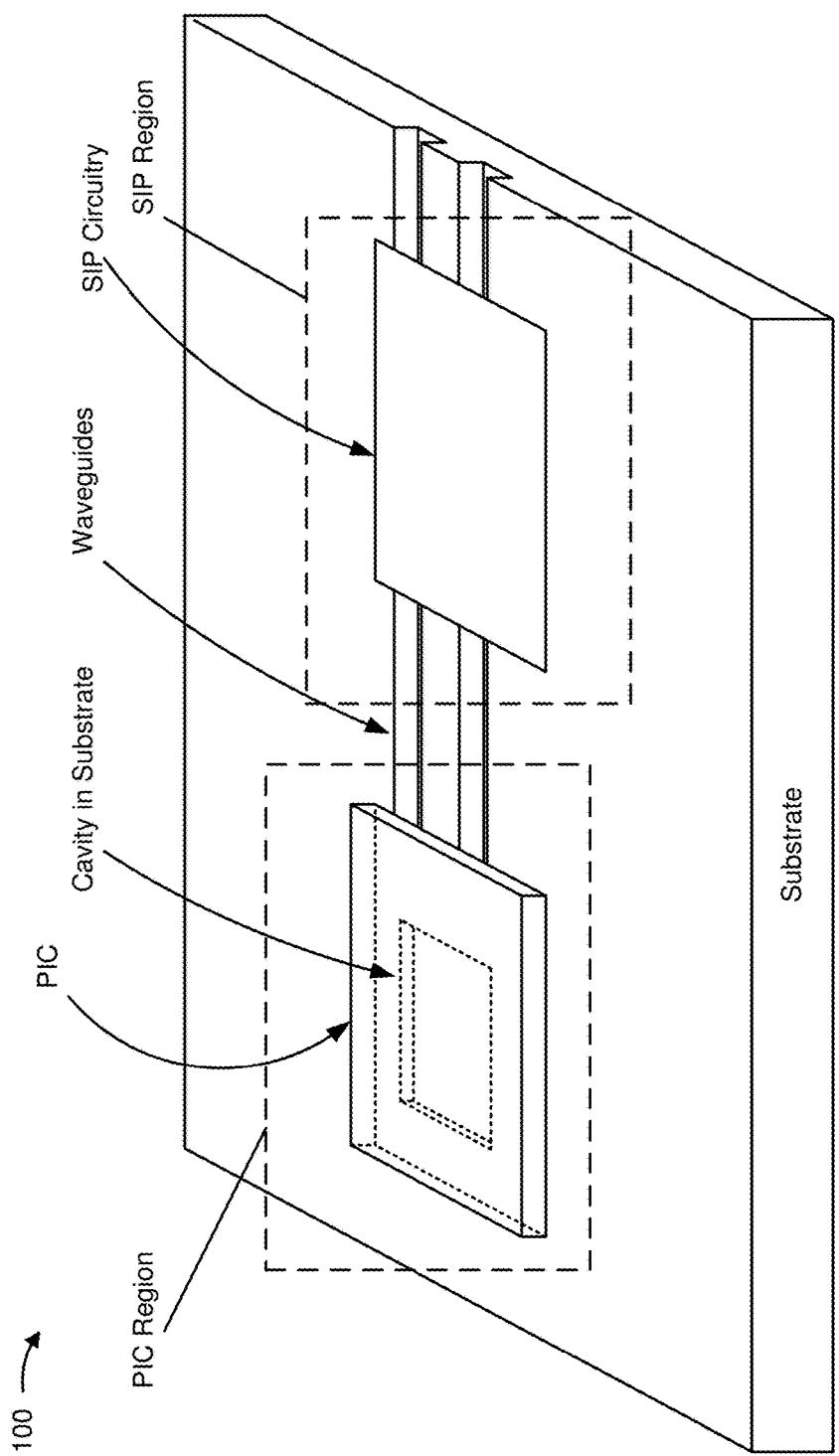
FIG. 1 is a diagram of an overview of an example implementation described herein.

The following detailed description of example implementations refers to the accompanying drawings. The same reference numbers in different drawings may identify the same or similar elements.

A wavelength division multiplexed (WDM) optical communication system may be utilized to transmit a set of optical signals between two or more nodes of a network. The set of optical signals may be combined using an optical multiplexer and transmitted from a transmit node of the network, via an optical fiber, to a receive node of the network. The set of optical signals may be demultiplexed at the receive node, and each optical signal, of the set of optical signals, may be provided to a corresponding receiver of a set of receivers. A particular receiver, of the set of receivers, may include a photodiode and may generate an electrical signal based on a received optical signal. The electrical signal may be processed by one or more signal processing devices.

A photonic integrated circuit (PIC) may include multiple optical devices integrated onto a common substrate (e.g., which may include multiple layers of material, such as electric conducting material, electric insulating material, or the like). For example, a transmitter PIC may include one or more lasers, modulators, optical combining elements, or the like. Similarly, a receiver PIC may include one or more photodiodes, modulators, optical combining elements, or the like. A substrate for a PIC may utilize a particular material, such as a Group III-V based material (e.g., Gallium-Arsenide (GaAs), Indium-Phosphide (InP), etc.), a Group II-VI based material, or the like. However, Group III-V materials and Group II-IV materials may be expensive and fragile, resulting in difficulty obtaining a wafer substrate of a size sufficient to produce a PIC-SIP device.

Silicon photonics (SIP) circuitry (referred to herein as "a SIP") may include optical devices for which a Group III-V material and/or a Group II-VI material is not required, such as an optical combiner, a splitter, a modulator, or the like. The optical devices (e.g., the optical combiner, the splitter, the modulator, etc.) may be provided on a silicon-based substrate. A SIP may be fabricated in a similar manner to a complementary metal-oxide-semiconductor (CMOS) circuit, and may be provided on a common substrate with a PIC. The substrate may include a PIC region (e.g., an area of the substrate at which the PIC is mounted) and a SIP region (e.g., an area of the substrate at which SIP circuitry is located, such as SIP circuitry being fabricated on the substrate, SIP circuitry being fabricated on another substrate which is mounted to the substrate, or the like).

Integrating a PIC region and a SIP region onto a common substrate may require a precise interconnection to optically couple output light from first optical devices of the PIC region to second optical devices of the SIP region. For example, an interconnect between the PIC region and the SIP region may require a level of accuracy of alignment at a sub-micron level in multiple dimensions to facilitate effective optical power transfer from the first optical devices to the second optical devices. However, dimensions of a PIC and a SIP may not be manufactured within a tolerance less than approximately 5 microns to 10 microns. For example, with regard to vertical dimension control, which may include variations between different optical devices associated with the interconnect. Insufficiently accurate tolerance may hinder usage of a pick and place machine to perform passive alignment (e.g., alignment using machine vision). Active alignment (e.g., alignment performed by activating light output from the PIC and positioning different optical devices to optically couple the different optical devices and bonding the different optical devices when optical coupling is achieved) may be time consuming and costly.

A PIC and/or a SIP may require precise temperature control for a laser to ensure a desired wavelength is provided by the PIC and/or the SIP. However, thermal isolation of the first optical devices, the second optical devices, and one or more control devices associated with the PIC and the SIP may be difficult based on the thermal conductivity of silicon and the proximity of the PIC region and the SIP region when integrated onto a common substrate.

Implementations, described herein, may utilize a common substrate (e.g., an interposer) for a PIC and a SIP with a cavity (e.g., a hermetically sealable cavity) into which optical devices of the PIC may be mounted. In this way, first optical devices of the PIC and second optical devices of the SIP are aligned and thermally isolated.

FIG. 1 is a diagram of an overview of an example implementation 100 described herein. As shown in FIG. 1, a PIC and a SIP may be integrated onto a common substrate, such as an interposer (e.g., an active interposer, a passive interposer, or the like). The PIC may be fabricated on a PIC substrate, which is mounted onto the common substrate at a PIC region of the common substrate such that an active region of the PIC is bonded to the common substrate, approximately at the common substrate, within a particular proximity of the common substrate, or the like. For example, the common substrate may include an attachment location (e.g., a set of ridges and/or grooves in a surface of the common substrate) associated with attaching to the PIC substrate (e.g., to a set of grooves and/or ridges associated with the PIC substrate). The SIP may be attached at a SIP region of the common substrate (e.g., with an active region of the SIP being bonded to the common substrate, approximately at the common substrate, within a particular proximity of the common substrate, etc.). Additionally, or alternatively, the SIP may be fabricated on a SIP substrate which is mounted to the common substrate at the SIP region of the common substrate.

The common substrate may provide one or more openings and/or waveguides facilitating optical coupling between the PIC and the SIP. For example, a particular waveguide may facilitate transmission of an optical signal generated by a laser of the PIC in the PIC region to a modulator of the SIP in the SIP region. In some implementations, the optical coupling may be via a free space and/or hermetically sealed free space optical coupling. Additionally, or alternatively, the optical coupling may be via a semi-hermetically sealed free space optical coupling. Additionally, or alternatively, additive manufacturing may be utilized to form the optical coupling. The PIC may be mounted to the common substrate above a cavity. Optical devices of the PIC may extend from a surface of the PIC toward the cavity and may be aligned with the waveguides. For example, a laser may be positioned approximately at the top of the cavity. Additionally, or alternatively, the laser may extend into the cavity. Additionally, or alternatively, the laser may be positioned above the cavity and may extend toward the cavity. In this way, an output for optical signals associated with the PIC may be aligned with an input for optical signals associated with the SIP. The cavity may be hermetically sealed by the common substrate and the PIC substrate facilitating a vacuum or a near vacuum environment in the cavity. In this way, optical devices of the PIC, positioned approximately in the cavity, are thermally isolated from optical devices of the SIP, one or more other devices, or the like.

In some implementations, the one or more other devices may be associated with the common substrate. For example, a set of application specific integrated circuits (ASICs) (e.g., that perform monitoring, controlling, driving, modulating, etc. on optical signals associated with the PIC and/or the SIP) may be mounted on the common substrate. In some implementations, one or more other PICs and/or one or more other SIPs may be mounted on the common substrate. For example, an optical signal may be routed from a first PIC to the SIP and from the SIP to a second PIC on the common substrate. Additionally, or alternatively, the optical signal may be routed back to the first PIC for processing.

In this way, a common substrate may integrate a PIC and a SIP, thereby facilitating alignment and thermal isolation between the PIC and the SIP. The common substrate, may also facilitate hermetically sealing the cavity and one or more optical devices (e.g., an optical source, such as a laser) of the PIC, one or more other devices, or the like. The common substrate (e.g., multiple layers of material forming a body section that is termed a substrate), with a PIC and a SIP integrated thereon, may be termed a PIC-SIP.

Figure 2:
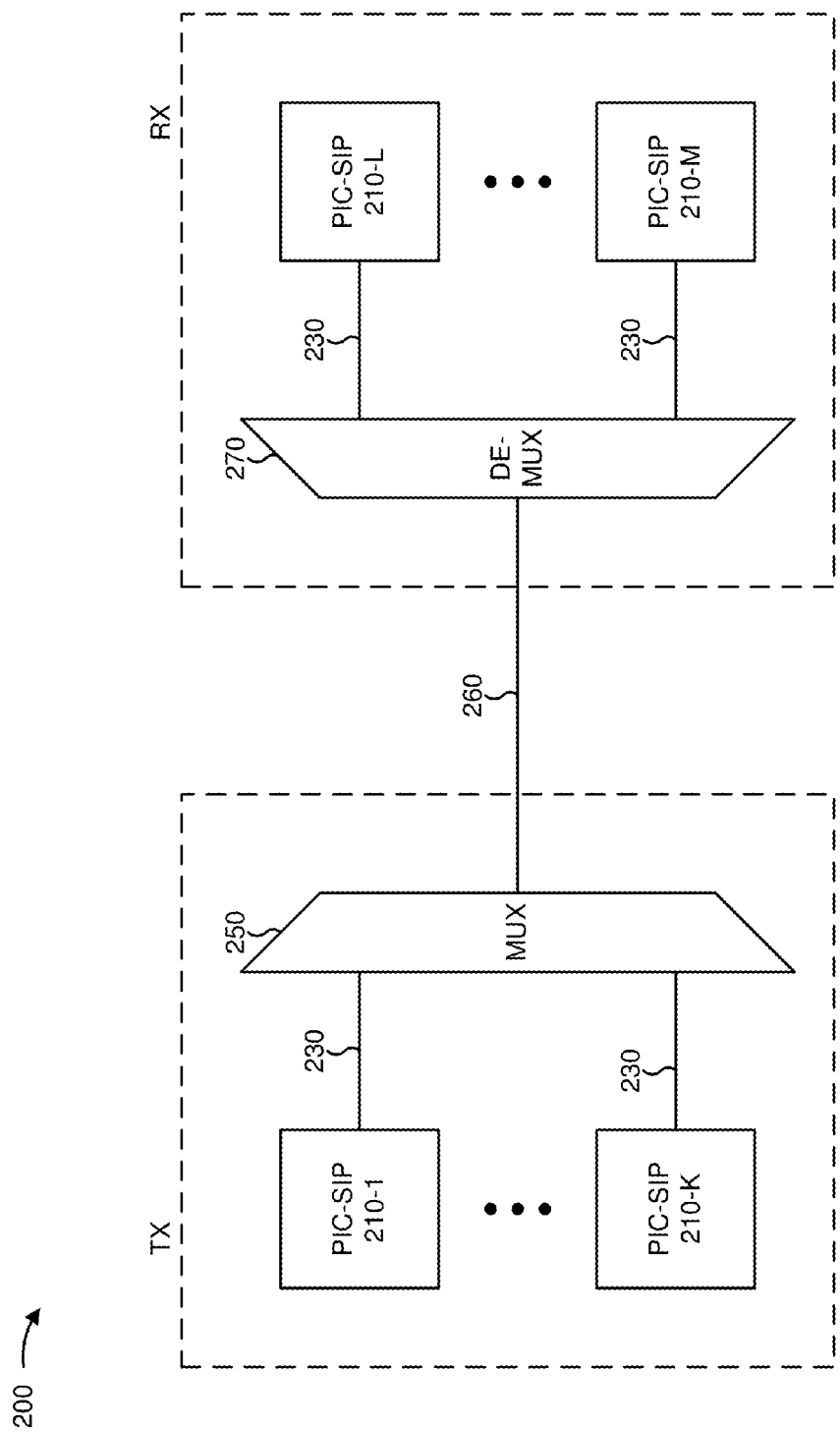
FIG. 2 is a diagram of an example network in which systems and/or methods, described herein, may be implemented.

FIG. 2 is a diagram of an example network 200 in which systems and/or methods, described herein, may be implemented. As shown in FIG. 2, a network may include PIC-SIP 210-1 through 210-M (M≥1) (hereinafter referred to collectively as "PIC-SIPs 210," and individually as "PIC-SIP 210"), one or more waveguides 230 (hereinafter referred to collectively as "waveguides 230," and individually as "waveguide 230"), a multiplexer (MUX) 250, a link 260, and a demultiplexer (DE-MUX) 270.

PIC-SIP 210 may include, for example, one or more optical devices integrated onto a common substrate. For example, PIC-SIP 210 may include a PIC, such as a transmitter PIC associated with transmitting an optical signal, a receiver PIC associated with receiving an optical signal, or the like, mounted to a common substrate at a PIC region of the common substrate (e.g., a region of the common substrate configured to receive the PIC). In some implementations, one or more optical devices of the PIC may extend from a substrate of the PIC toward a cavity formed into the common substrate of PIC-SIP 210. In some implementations, PIC-SIP 210 may include a SIP. For example, PIC-SIP 210 may be fabricated and/or assembled with optical devices associated with the SIP mounted onto the common substrate of PIC-SIP 210 at a SIP region (e.g., a region configured to receive optical devices associated with the SIP).

Waveguides 230 may include, for example, one or more optical communication paths associated with facilitating transmission of optical signals. In some implementations, each PIC-SIP 210 may connect to one waveguide 230 or to multiple waveguides 230 to transmit signal channels of PIC-SIP 210 to multiplexer 250. Additionally, or alternatively PIC-SIP 210 may receive an optical signal from demultiplexer 270 via link 260. In some implementations, waveguide 230 may correspond to waveguide 340, described herein with respect to FIG. 3.

Additionally, or alternatively, PIC-SIP 210 may be fabricated with a SIP region attachment location configured to receive a substrate of the SIP onto which the one or more optical devices associated with the SIP are mounted. For example, a SIP may be fabricated with one or more optical devices mounted to a SIP substrate, and the SIP substrate may be mounted at the SIP region to the common substrate of PIC-SIP 210. In this way, if optical devices of the SIP are defective, the SIP substrate may be removed and replaced. In some implementations, PIC-SIP 210 may include one or more waveguides. For example, PIC-SIP 210 may include one or more waveguides facilitating optical coupling (e.g., an optical connection) for the PIC and the SIP and/or one or more waveguides facilitating receiving an optical signal from another device (e.g., another PIC-SIP 210) and/or transmitting the optical signal to another device. In some implementations, alignment of the PIC, the SIP, and the waveguides on PIC-SIP 210 may be to an alignment tolerance of less than approximately 5 microns.

Multiplexer 250 may include an optical multiplexer, such as an arrayed waveguide grating (AWG) or some other multiplexing device. In some implementations, multiplexer 250 may combine multiple modulated outputs (referred to as "signal channels"), associated with PIC-SIP 210, into a wavelength division multiplexed (WDM) signal.

Links 260 may include optical links to transmit signal channels of PIC-SIP 210. In some implementations, a first network node (e.g., a transmitter (TX) node, an optical add-drop multiplexer (OADM), or the like) associated with multiplexer 250 may provide an optical signal to a second network node (e.g., a receiver (RX) node, an OADM, or the like) associated with demultiplexer 270 via link 260. In some implementations, links 260 may be made from a birefringent material and/or some other material.

Demultiplexer 270 may include an optical demultiplexer, such as an arrayed waveguide grating (AWG) or some other demultiplexing device. In some implementations, demultiplexer 270 may disassociate multiple signal channels, from a wavelength division multiplexed (WDM) signal, and provide a particular signal channel, of the multiple signal channels, to PIC-SIP 210 (e.g., via link 260).

The number and arrangement of devices and networks shown in FIG. 2 are provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
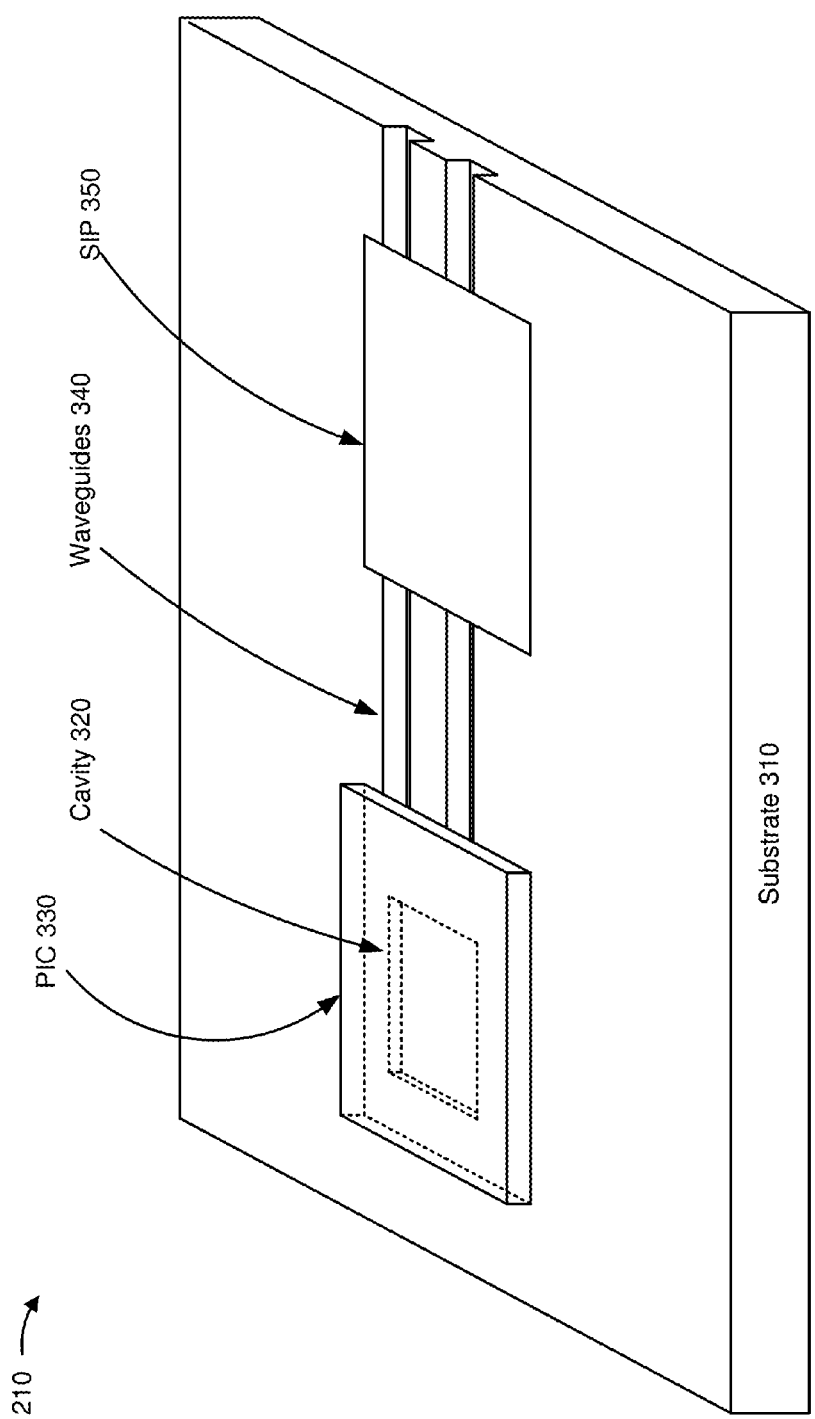
FIG. 3 is a diagram of an example PIC-SIP device.

FIG. 3 is a diagram of components of PIC-SIP 210 shown in network 200 of FIG. 2. As shown in FIG. 3, PIC-SIP 210 may include a substrate 310, a cavity 320, a PIC 330, one or more waveguides 340 (hereinafter referred to collectively as "waveguides 340," and individually as "waveguide 340"), and a SIP 350.

Substrate 310 may include an interposer/carrier onto which may be mounted PIC 330 and/or SIP 350, in some implementations. For example, substrate 310 may include a silicon-on-insulator (SOI) substrate. In some implementations, cavity 320 may be at least partially covered by PIC 330. For example, PIC 330 and substrate 310 may be attached to form an environmental seal (e.g., a seal that may provide thermal isolation, mechanical isolation, atmospheric isolation, or the like), a hermetic seal, a near-hermetic seal, or the like over cavity 320 when PIC 330 is mounted onto substrate 310. In some implementations, substrate 310 may include an attachment location for PIC 330 and/or SIP 350 that may include a sealing structure, such as a set of grooves, holes, and/or ridges configured to facilitate mounting PIC 330 and forming the hermetic seal around cavity 320. For example, substrate 310 may include a sealing structure associated with a set of openings for optically coupling an optical source of PIC 330 to an optical device of SIP 350. In some implementations, PIC 330 may mount to substrate 310 via a particular type of attachment. For example, PIC 330 and/or a sealing structure associated with PIC 330 may mount to substrate 310 via a soft solder connection, a hard solder connection, a pure metal connection, or the like.

In some implementations, substrate 310 and/or a substrate of PIC 330, SIP 350, or the like may include a particular material, such as a metal-based material, a ceramic-based material, a polymer-based material, or the like. For example, substrate 310, the substrate of PIC 330, SIP 350, or the like may include a silicon semiconductor, indium-phosphide, gallium arsenide, a polymer composite, a fiber reinforced polymer composite, a polyimide, a liquid crystal polymer, silicon dioxide, silicon nitride, aluminum nitride, beryllium oxide, aluminum oxide, or the like. In some implementations, substrate 310 may include multiple layers of material, such as alternating dielectric layers and conductive layers, or the like. In some implementations, substrate 310 may include cavity 320. For example, an etching technique, a stamping technique, a substrate layering technique, or the like may be utilized to fabricate cavity 320 in substrate 310.

In some implementations, substrate 310 may include one or more devices integrated into substrate 310. For example, substrate 310 may include an electrical device, an optical device, or the like integrated into one or more layers of material forming substrate 310.

In some implementations, cavity 320 may facilitate passive optical alignment for optical devices of PIC 330 and optical devices of SIP 350. For example, a laser, extending from a surface of PIC 330 toward a bottom surface of cavity 320, may passively align with waveguides 340 to facilitate optical coupling with an arrayed waveguide grating (AWG) of SIP 350. In some implementations, cavity 320 may facilitate mechanical isolation of PIC 330 from substrate 310. For example, optical devices of PIC 330, by being mounted to PIC 330 and extending toward the bottom surface of cavity 320 without being mounted to substrate 310, may be mechanically isolated from thermal expansion/contraction, vibration, or the like associated with substrate 310. In some implementations, cavity 320 may facilitate an electrical feed through for PIC 330. For example, cavity 320 may be constructed to include one or more electrical interconnections for input electrical signals, output electrical signals, or the like associated with PIC 330.

In some implementations, cavity 320 may be formed into substrate 310. For example, substrate 310 may be etched, stamped, ablated, and/or have material deposited thereon, to form cavity 320. Additionally, or alternatively, cavity 320 may be formed from PIC 330. For example, cavity 320 may be formed from substrate 310, a portion of a substrate of PIC 330, a sealing structure, or the like. For example, a first region of substrate 310 may be configured to receive PIC 330 and a second region of PIC 330 may form cavity 320 with the first region of substrate 310.

In some implementations, cavity 320 may facilitate a vacuum environment for optical devices of PIC 330. For example, when cavity 320 is hermetically sealed by substrate 310 and PIC 330, a vacuum environment may be provided to optical devices of PIC 330 extending toward the bottom surface of cavity 320, thereby providing thermal isolation. In some implementations, cavity 320 may refer to free space between a first surface of substrate 310, a second surface of a PIC substrate of PIC 330, and a sealing structure facilitating mounting of PIC 330 to substrate 310. In some implementations, substrate 310 may include a structure associated with facilitating evacuation of air from cavity 320, such as a valve, a port, or the like.

PIC 330 may include a photonic integrated circuit mounted to substrate 310, in some implementations. For example, PIC 330 may include a set of optical devices mounted to a PIC substrate, which is mounted to substrate 310, such as an optical source (e.g., a laser) that extends into the cavity and generates light based on a voltage or current being applied thereto. In some implementations, PIC-SIP 210 may include multiple PICs 330. For example, PIC-SIP 210 may include a transmitter PIC 330 (e.g., including an optical source, such as a laser) and a receiver PIC 330 (e.g., including a photodetector). Additionally, or alternatively, PIC-SIP 210 may include a first PIC 330 optically coupled to a second PIC 330 (e.g., that includes circuitry associated with SIP 350). In some implementations, PIC 330 may include one or more optical devices associated with a Group III-V substrate (e.g., InP). For example, PIC 330 may include a laser, a photodetector, a semiconductor optical amplifier (SOA), a variable optical attenuator (VOA), a power monitoring photodiode, or the like. In some implementations, the optical devices of PIC 330 may be mounted to a surface of PIC 330. For example, a laser may be mounted to the surface of PIC 330 and extend outward from the surface of PIC 330. Additionally, or alternatively, a photodetector may be mounted to the surface of PIC 330 and extend into cavity 320.

In some implementations, the optical devices of PIC 330 may extend toward the bottom surface of cavity 320. For example, PIC 330 may be mounted to substrate 310 with one or more of the optical devices of PIC 330 extending toward the bottom surface of cavity 320. In this case, the PIC substrate may attach to substrate 310 (e.g., via a soft-soldering technique). In some implementations, the one or more optical devices may extend into cavity 320 (e.g., below a top surface of substrate 310), may extend above cavity 320 (e.g., above a top surface of substrate 310), may be approximately even with cavity 320 (e.g., approximately even with a top surface of substrate 310), or the like.

Waveguides 340 may include one or more optical communication paths associated with facilitating transmission of optical signals from optical devices of PIC 330 toward optical devices of SIP 350, or vice versa. For example, waveguides 340 may be formed on substrate 310, in substrate 310, or the like to facilitate optical coupling of PIC 330 (e.g., an optical source of PIC 330) to SIP 350. In some implementations, waveguides 340 may include another type of optical interconnect (e.g., that receives light from an optical source of PIC 330) provided on or in substrate 310 of PIC-SIP 210 and outside of cavity 320, such as a butt coupling interconnect, a free space coupling interconnect, an optical wire bond coupling, or the like. In some implementations, the optical interconnect (e.g., waveguides 340) may include another device, such as an optical lens. While FIG. 3 shows two waveguides 340, in practice, there may be additional waveguides 340 to facilitate transmission of optical signals from PIC 330 to SIP 350, or vice versa.

SIP 350 may include a silicon photonics circuit associated with substrate 310, in some implementations. For example, SIP 350 may include a set of silicon-based optical devices, such as a modulator (e.g., waveguide modulator), a phase adjuster, a passive optical device (e.g., an optical splitter, an optical combiner, an optical decombiner, etc.), a polarization rotator, a polarization beam combiner, a polarization beam splitter, or the like. In some implementations, SIP 350 may process one or more optical signals received from PIC 330 (e.g., via one or more waveguides 340), and SIP 350 may output the one or more optical signals to one or more optical fibers for transmission to another PIC-SIP 210 (e.g., via link 260). In some implementations, substrate 310 may be configured to receive another substrate that includes optical components of SIP 350. Additionally, or alternatively, substrate 310 may include a region that includes optical components of SIP 350 mounted to substrate 310.

In some implementations, PIC-SIP 210 may include a pump laser mounted to substrate 310. For example, a pump laser providing output at between approximately 980 nanometers and approximately 1480 nanometers may provide optical gain to a signal from an optical source of PIC 330 via waveguides 340. In some implementations, substrate 310 may include a set of waveguides associated with connecting an output of the pump laser to an output of SIP 350. Additionally, or alternatively, the pump laser may connect to an erbium doped fiber external to PIC-SIP 210 to provide optical signal gain to an output of SIP 350. In this way, a pump laser may be integrated onto substrate 310 to provide optical signal gain to modulated optical signals output from SIP 350.

In some implementations, PIC-SIP 210 may include one or more other devices mounted to substrate 310. For example, substrate 310 may facilitate mounting of a band gap, a Zener diode, a circuit element, a circuit, a capacitor, a resistor, an inductor, or the like.

The number and arrangement of components shown in FIG. 3 are provided as an example. In practice, PIC-SIP 210 may include additional components, fewer components, different components, or differently arranged components than those shown in FIG. 3. Additionally, or alternatively, a set of components shown in FIG. 3 may perform one or more functions described herein as being performed by another set of components of FIG. 3.

Figure 4:
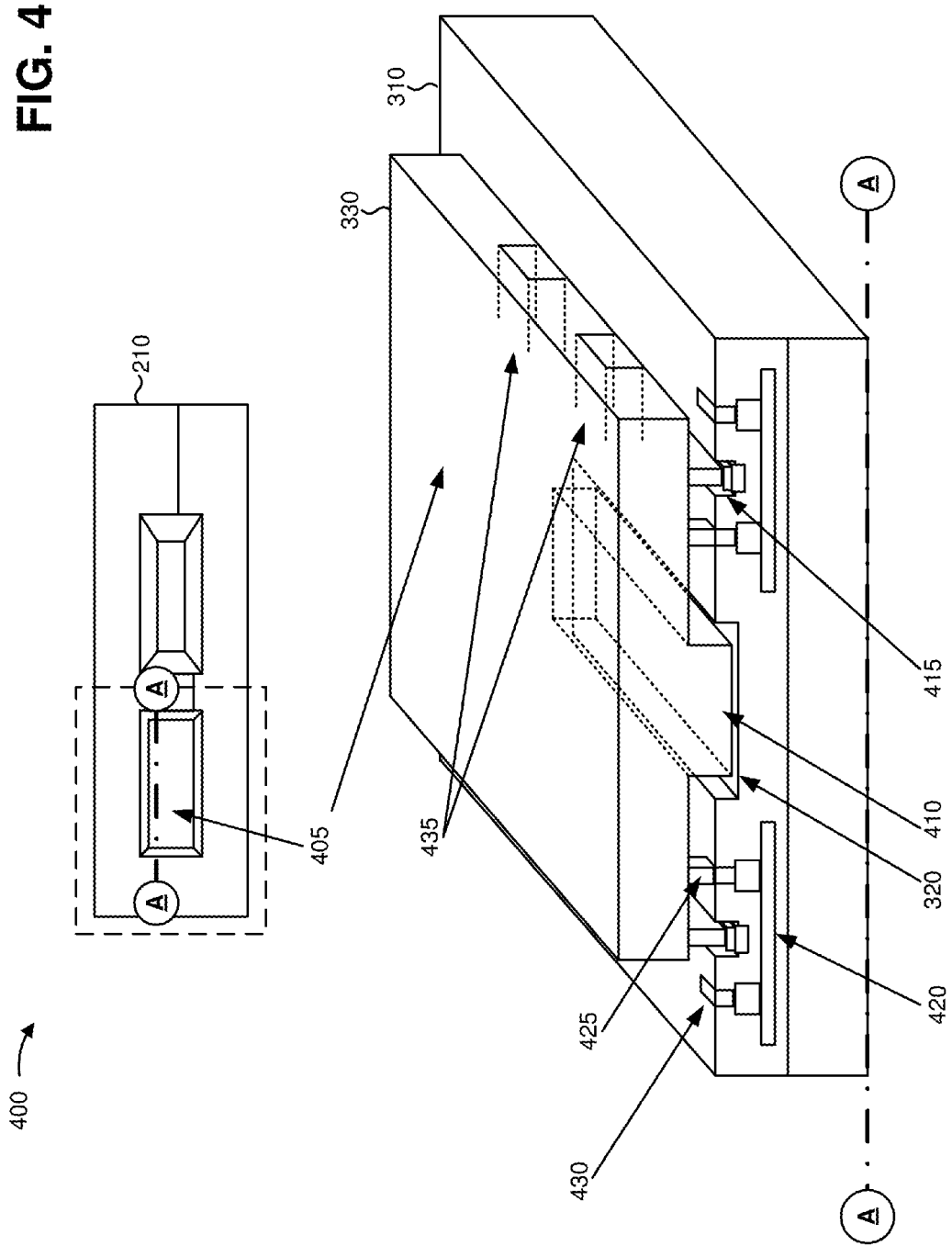
FIG. 4 is a diagram of an example PIC-SIP device.

FIG. 4 is a diagram of an example implementation 400 of an example PIC-SIP device, such as PIC-SIP 210. As shown in FIG. 4, PIC-SIP 210 may include PIC region 405. PIC region 405 may include a portion of PIC-SIP 210 at which PIC 330 is mounted to substrate 310. As shown by reference number 410, a portion of PIC 330 (e.g., a set of optical devices 410, such as a set of lasers) may extend into cavity 320 of substrate 310. A gap (e.g., an area of free space evacuated to a vacuum or a near vacuum) is maintained between optical devices 410 and a bottom surface of cavity 320, thereby mechanically decoupling optical devices 410 from substrate 310. In some implementations, mechanically decoupling optical devices 410 from substrate 310 may reduce stress induced degradation of PIC 330.

As further shown in FIG. 4, and by reference number 415, first material of substrate 310 and second material of PIC 330 may attach to mount PIC 330 to substrate 310 and facilitate an environmental seal of cavity 320 (e.g., a hermetic seal). In some implementations, a thin film of dielectric material and/or semiconductor material may be deposited to facilitate the hermetic seal, such as by forming a sealing structure. Additionally, or alternatively, a semi-hermetic seal may be formed, such as by depositing a thin film of a polymer (e.g., an epoxy, a silicon material, or the like) onto a portion of the substrate. Additionally, or alternatively, the sealing structure may include an epitaxial material, an amorphous semiconductor material, an amorphous ceramic material, a metal material, or the like. In some implementations, the second material of PIC 330 may be shaped to provide thermal isolation between PIC 330 and substrate 310. For example, the second material may include a ridge of material that connects to a groove of first material of substrate 310, thereby reducing a surface area of contact between PIC 330 and substrate 310 (e.g., reduced relative with another attachment technique not utilizing a ridge and groove connection) and reducing conductive heat transfer associated with contact between PIC 330 and substrate 310 (e.g., reduced relative to the other attachment technique).

As further shown in FIG. 4, and by reference number 420, substrate 310 may include a conductive pass through 420 to facilitate electrical connection to portions of PIC 330 inside a hermetic seal formed by PIC 330 and substrate 310, to one or more devices outside of the hermetic seal. For example, PIC 330 may include electrical connector 425 that connects to conductive pass through 420 of substrate 310. Further to the example, conductive pass through 420 may optionally connect at surface connector 430 to another device, facilitating electrical connection from the other device to PIC 330 and/or from PIC 330 to the other device.

As further shown in FIG. 4, and by reference number 435, PIC 330 and/or substrate 310 may include a set of waveguide pass throughs 435 facilitating transmission of an optical signal generated by laser 410 to waveguides 340 and SIP 350. For example, a thin film material, such as an inorganic thin film material (e.g., amorphous-silicon, silicon nitride, silicon oxide, indium phosphide, gallium arsenide, etc.), an organic thin film material (e.g., epoxy, fiber-reinforced epoxy, organic silicon, liquid crystal polymer, photo-definable polymer, benzocyclobutene, polyimide, etc.), or the like, may be utilized to provide the set of waveguide pass throughs 435 and maintain the hermetic seal formed by substrate 310 and PIC 330. In some implementations, the thin film material may be selected based on a refractive index of the material relative to air. For example, a particular material may be selected based on having a higher refractive index relative to another material, thereby reducing light diffraction, signal loss, or the like at an air interface with PIC 330 (e.g., reduced relative to the other material with the lower refractive index). In some implementations, the thin film (e.g., amorphous-silicon) may be etched, thereby confining light transmitted there-through.

The number and arrangement of components shown in FIG. 4 are provided as an example. In practice, PIC-SIP 210 may include additional components, fewer components, different components, or differently arranged components than those shown in FIG. 4. Additionally, or alternatively, a set of components shown in FIG. 4 may perform one or more functions described herein as being performed by another set of components of FIG. 4.

Figure 5A:
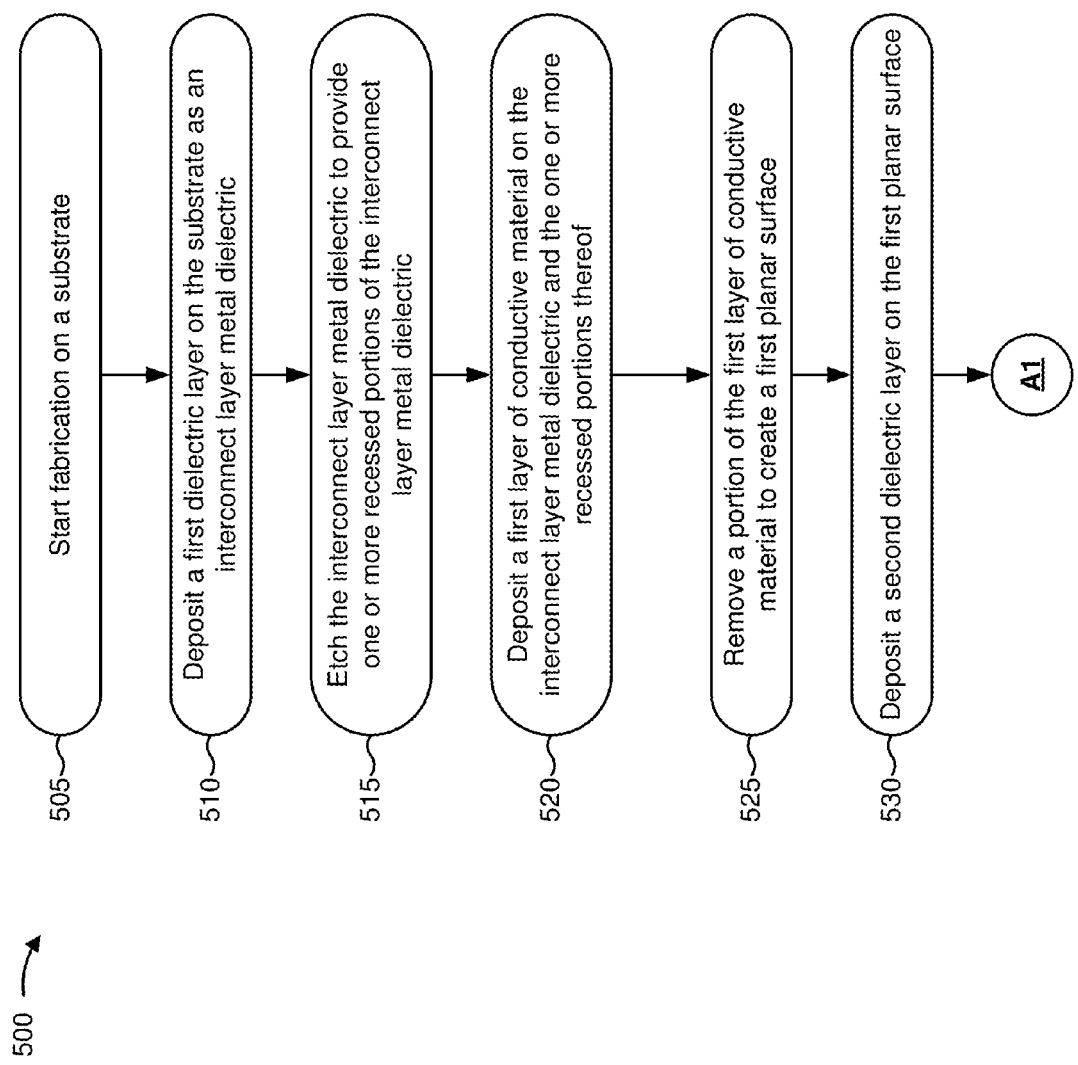
FIGS. 5A-5C are flow charts of an example process for fabricating a substrate for a PIC-SIP.
Figure 5B:
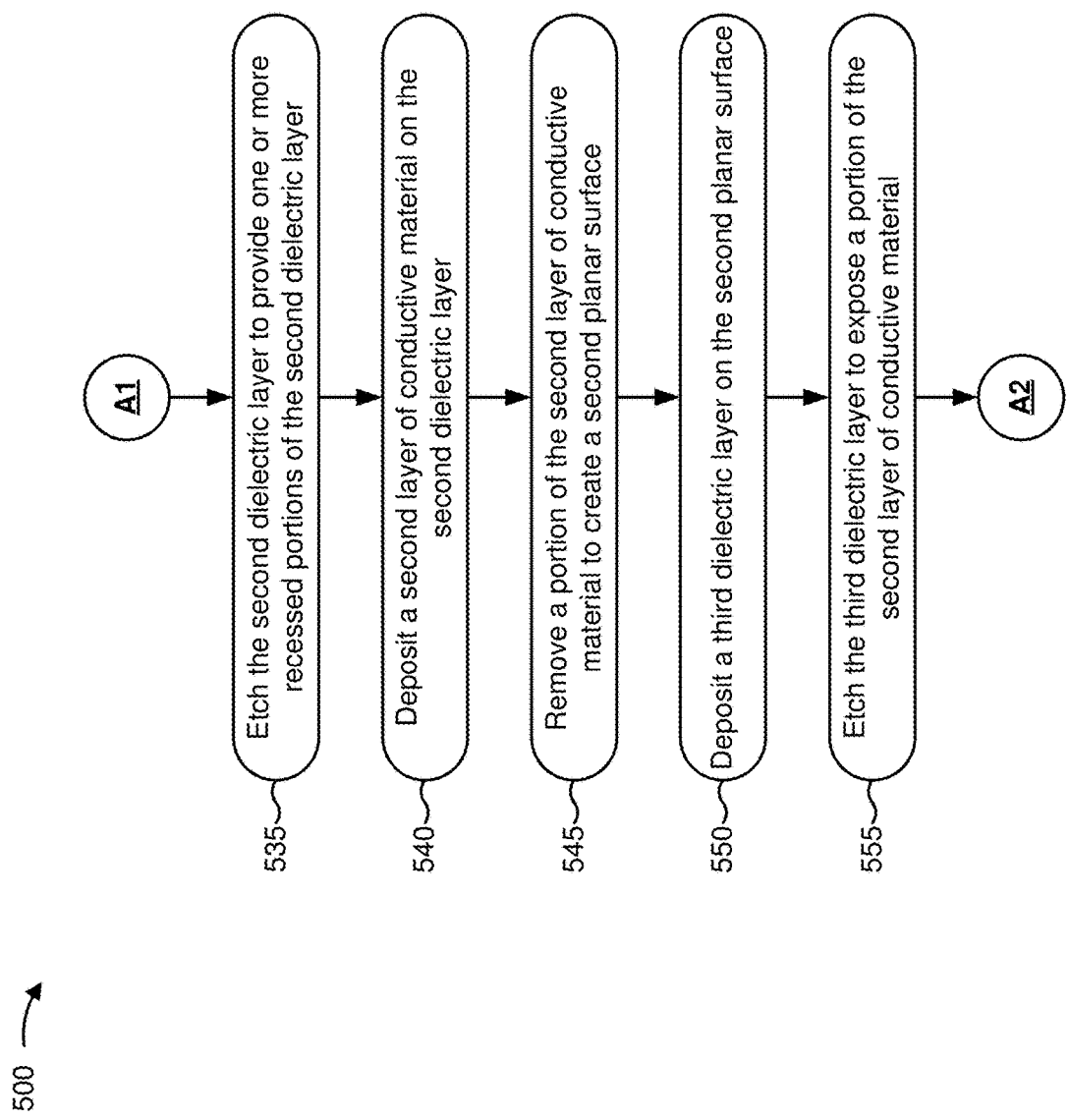
Figure 5C:
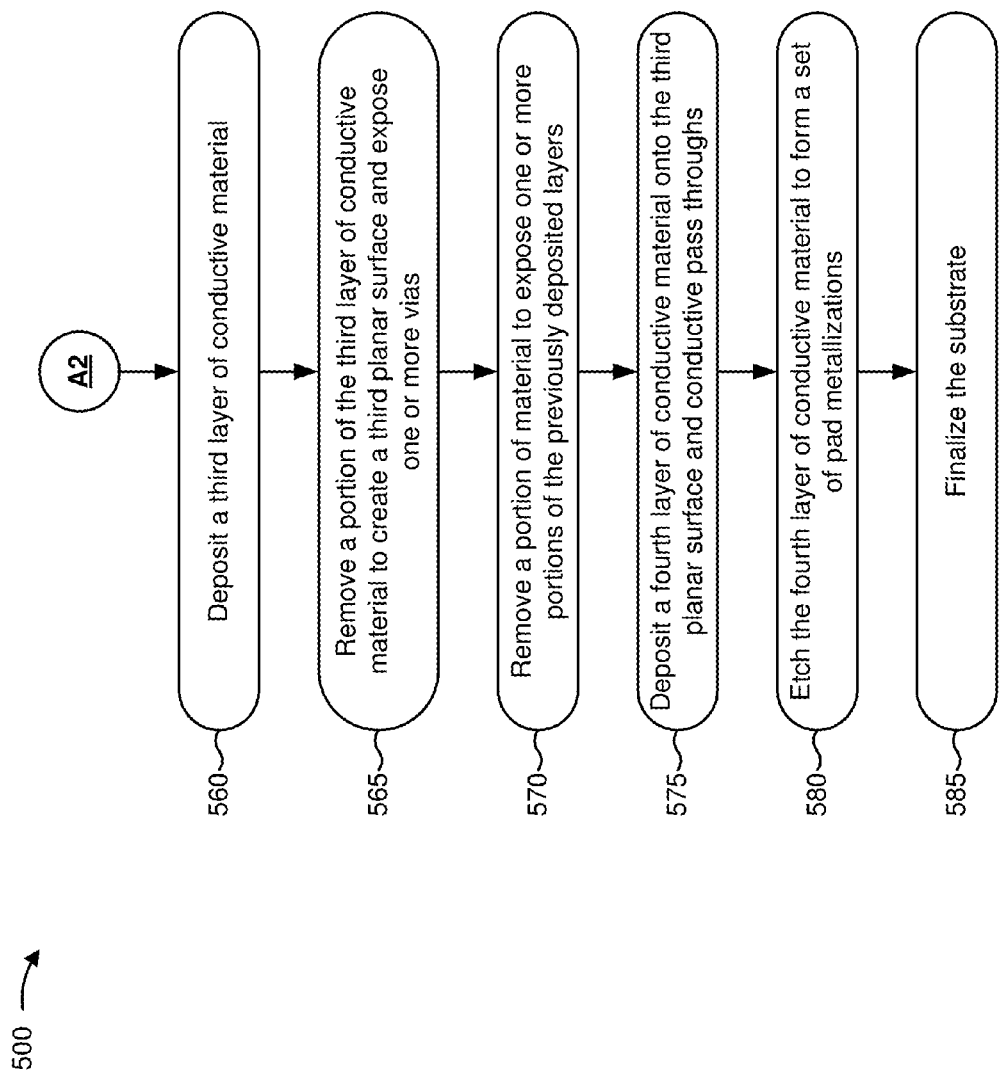

FIGS. 5A-5C are flow charts illustrating an example process 500 for fabricating a substrate for a PIC-SIP. Process 500 may be applied to the design of a PIC-SIP substrate used to mount a PIC, a SIP, one or more control devices, or the like. FIGS. 6A-6G are diagrams of an example implementation 600 relating to example process 500 shown in FIGS. 5A-5C.

As shown in FIG. 5A, process 500 may include starting fabrication on a substrate (block 505). For example, as shown in FIG. 6A, the substrate (e.g., silicon wafer 605) may be provided. In some implementations, silicon wafer 605 may be dimensioned to produce multiple PIC-SIPs 210. For example, process 500 may be performed on a substrate which is then cut and divided into multiple substrate portions, each of which is utilized for a PIC-SIP 210.

As further shown in FIG. 5A, process 500 may include depositing a first dielectric layer on the substrate as a interconnect layer metal dielectric (block 510). For example, as shown in FIG. 6A, first dielectric layer 610 is deposited on silicon wafer 605. In some implementations, first dielectric layer 610 may be associated with conductive material that is patterned to facilitate an electrical interconnection between PIC 330 and one or more control devices (e.g., a connection of one or more devices inside cavity 320 of substrate 310, such as an optical source of PIC 330, to one or more devices outside of cavity 320 of substrate 310), and first dielectric layer 610 may be termed an interconnect layer metal dielectric. For example, first dielectric layer 610 and/or one or more other layers may be etched, stamped, ablated, deposited, or the like to form the electrical interconnection.

As further shown in FIG. 5A, process 500 may include etching the interconnect layer metal dielectric to provide one or more recessed portions of the interconnect layer metal dielectric (block 515). For example, as shown in FIG. 6A first dielectric layer 610 (e.g., the interconnect layer dielectric) is etched to provide the one or more recessed portions for forming metal interconnects.

Figure 6B:
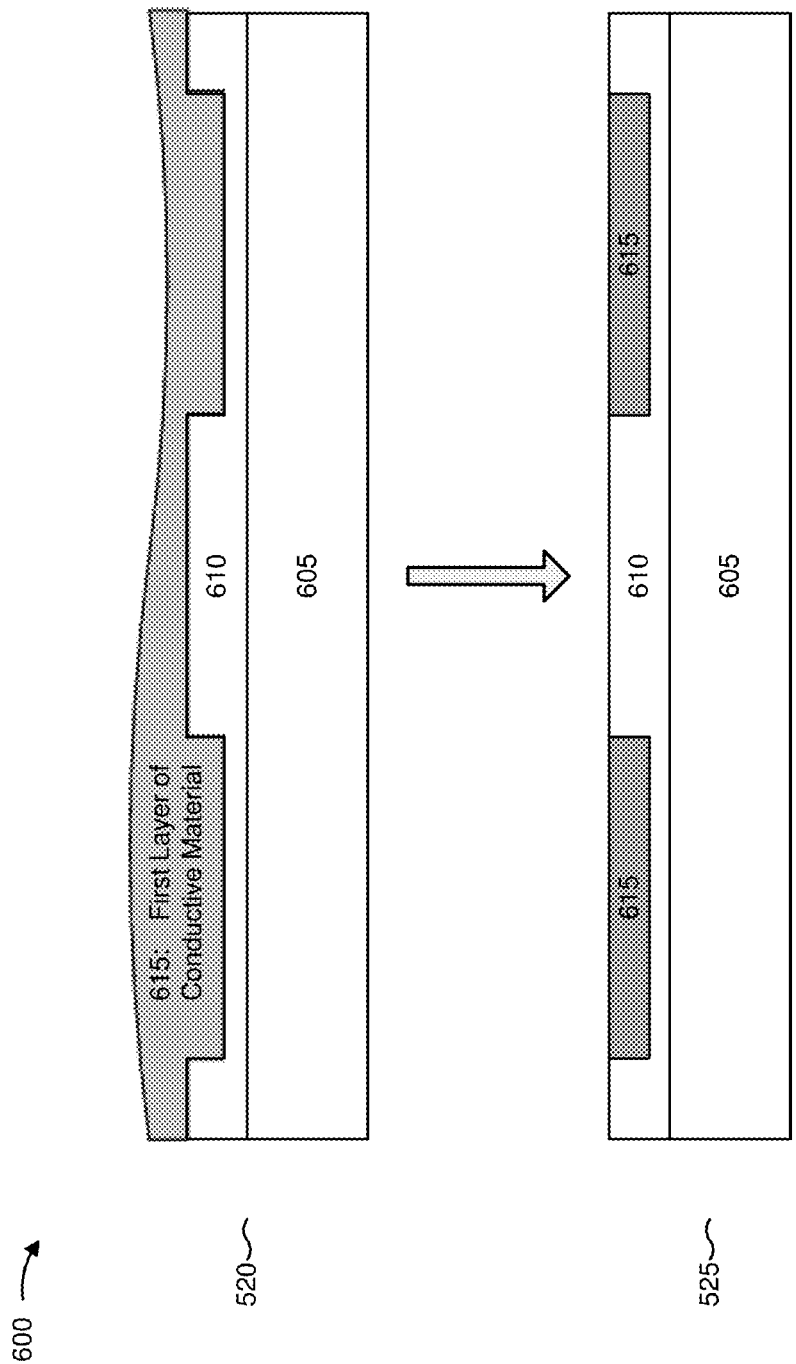

As further shown in FIG. 5A, process 500 may include depositing a first layer of conductive material on the interconnect layer metal dielectric and the one or more recessed portions thereof (block 520). For example, as shown in FIG. 6B, first layer of conductive material 615 may be deposited onto first dielectric layer 610.

As further shown in FIG. 5A, process 500 may include removing a portion of the first layer of conductive material to create a first planar surface (block 525). For example, as shown in FIG. 6B, the portion of first layer of conductive material 615 is removed to form the first planar surface. In some implementations, the portion of first layer of conductive material 615 may be removed using chemical-mechanical polishing (CMP). For example, a CMP technique may be utilized to perform planarization on first layer of conductive material 615. In some implementations, a portion of first layer of conductive material 615 that remains may be utilized to facilitate an electrical connection between PIC 330 and one or more other devices.

Figure 6C:
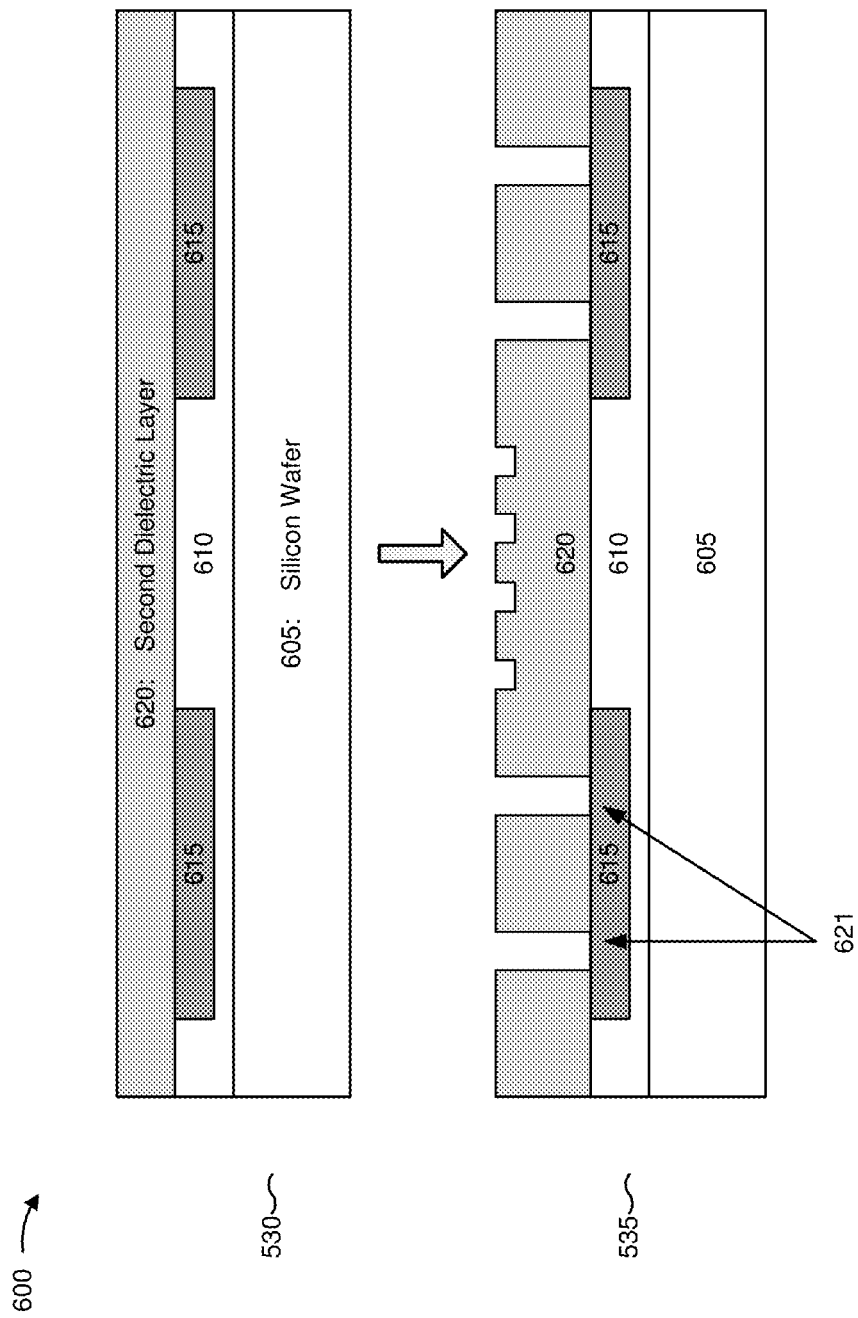

As further shown in FIG. 5A, process 500 may include depositing a second dielectric layer on the first planar surface (block 530). For example, as shown in FIG. 6C, second dielectric layer 620 is deposited onto the first planar surface (e.g., first dielectric layer 610 and/or first layer of conductive material 615).

As shown in FIG. 5B, process 500 may include etching the second dielectric layer to provide one or more recessed portions of the second dielectric layer (block 535). For example, as shown in FIG. 6C, second dielectric layer 620 is etched to provide one or more recessed portions. As shown by reference number 621, etching second dielectric layer 620 may facilitate forming one or more vias that provide an electrical connection to a metal interconnect formed from first layer of conductive material 615.

Figure 6D:
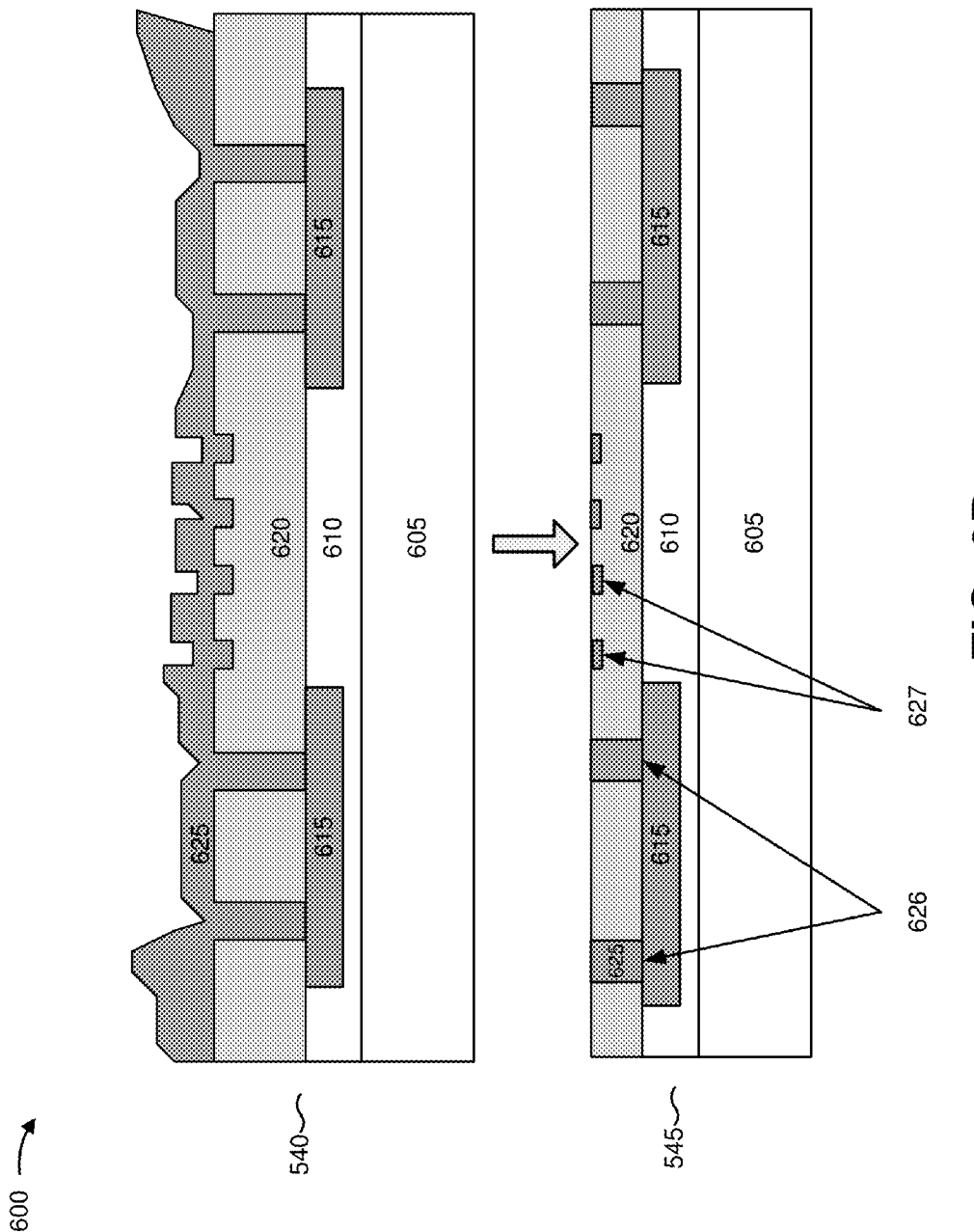

As further shown in FIG. 5B, process 500 may include depositing a second layer of conductive material on the second dielectric layer (block 540). For example, as shown in FIG. 6D, second layer of conductive material 625 is deposited onto second dielectric layer 620, filling the one or more recessed portions of second dielectric layer 620.

As further shown in FIG. 5B, process 500 may include removing a portion of the second layer of conductive material to create a second planar surface (block 545). For example, as shown in FIG. 6D, the portion of the second layer of conductive material 625 is removed from second layer of conductive material 625 (e.g., using a CMP technique). In this case, and as shown by reference number 626, portions of second layer of conductive material 625 remaining after planarization may form one or more via metallizations for the one or more vias (e.g., to facilitate electric connection using the one or more vias). As shown by reference number 627, other portions of second layer of conductive material 625 remaining after planarization may form conductive pass throughs.

Figure 6E:
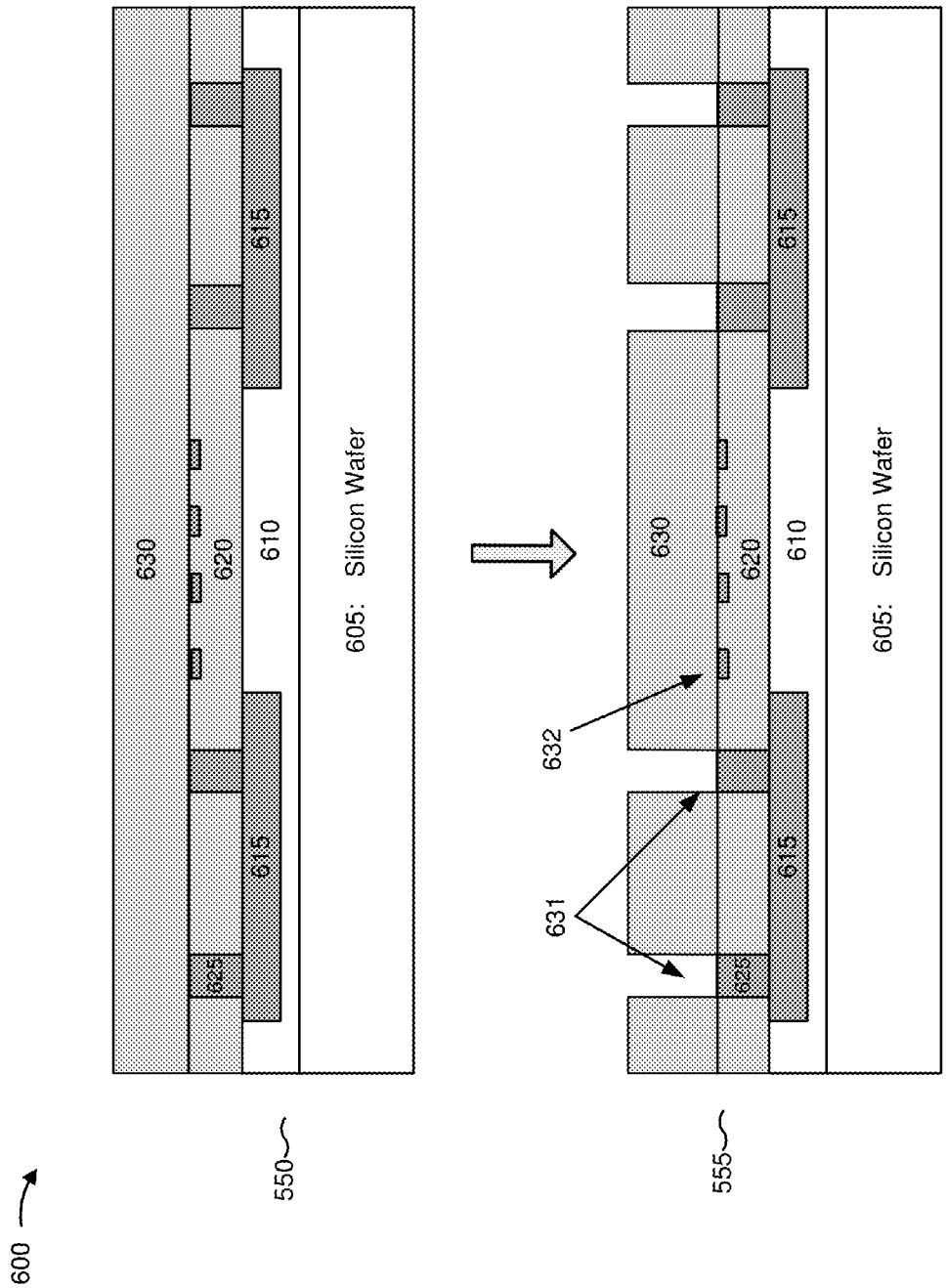

As further shown in FIG. 5B, process 500 may include depositing a third dielectric layer on the second planar surface (block 550). For example, as shown in FIG. 6E, third dielectric layer 630 is deposited onto the second planar surface.

As further shown in FIG. 5B, process 500 may include etching the third dielectric layer to expose a portion of the second layer of conductive material (block 555). For example, as shown in FIG. 6E, and by reference number 631, third dielectric layer 630 is etched to expose the one or more vias. As shown by reference number 632, the conductive pass throughs are insulated by second dielectric layer 620 and third dielectric layer 630.

Figure 6F:
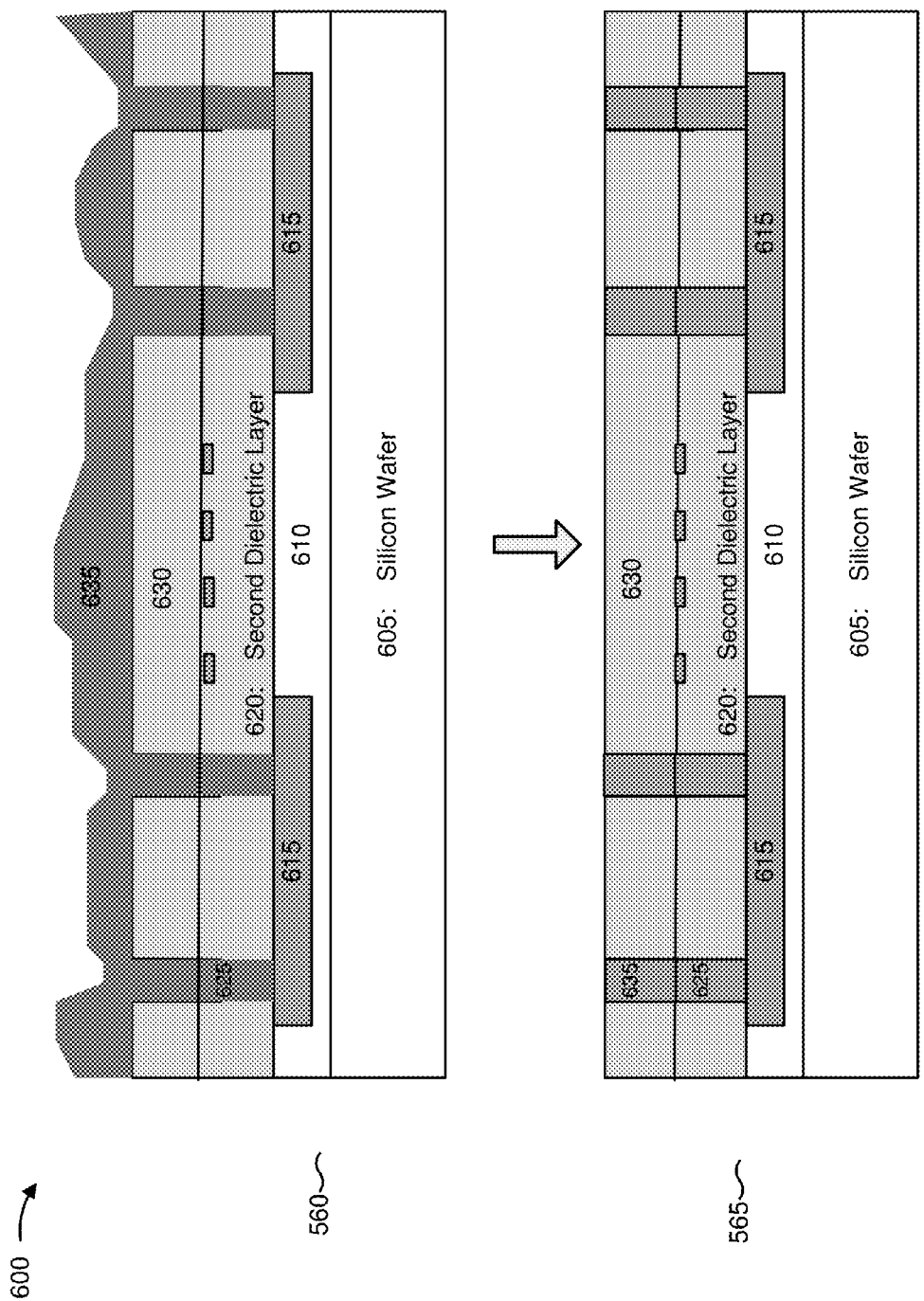

As shown in FIG. 5C, process 500 may include depositing a third layer of conductive material (block 560). For example, as shown in FIG. 6F, third layer of conductive material 635 is deposited to fill in the one or more vias, extending the one or more via metallizations.

As further shown in FIG. 5C, process 500 may include removing a portion of the third layer of conductive material to create a planar surface and expose the one or more vias (block 565). For example, as in FIG. 6F, the portion of third layer of conductive material 635 is removed to expose the one or more vias, such as by a CMP technique.

Figure 6G:
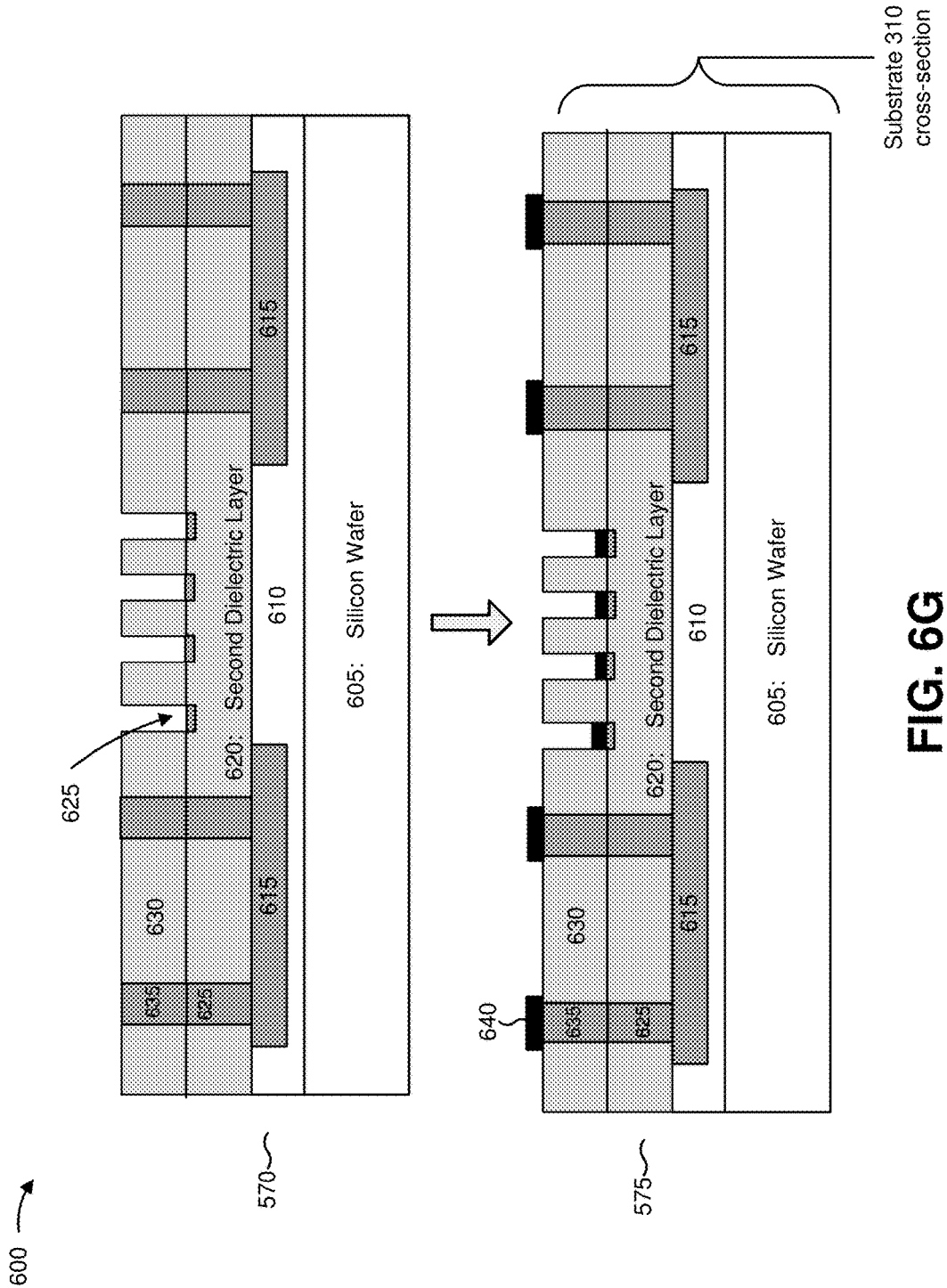

As further shown in FIG. 5C, process 500 may include removing a portion of material to expose one or more portions of the previously deposited layers (block 570). For example, as shown in FIG. 6G, the portion of material is removed, thereby exposing the conductive pass throughs formed from second layer of conductive material 625.

As further shown in FIG. 5C, process 500 may include depositing a fourth layer of conductive material onto the third planar surface and the conductive pass throughs (block 575), and may include etching the fourth layer of conductive material to form a set of pad metallizations (block 580). For example, as shown in FIG. 6G, fourth layer of conductive material 640 may be deposited and etched to form the set of pad metallizations facilitating attachment to the one or more vias and/or the conductive pass throughs.

As further shown in FIG. 5C, process 500 may include finalizing the substrate (block 585). For example, one or more modules, such as PIC 330, SIP 350, or the like may be mounted to the substrate using the set of pad metallizations to form electrical connections with PIC 330. In this way, substrate 310 may be formed and configured to receive PIC 330 and/or SIP 350.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. As indicated above, FIGS. 6A-6G are provided merely as an example. Other examples are possible and may differ from what was described with regard to FIGS. 6A-6G.

FIGS. 7A-7E are diagrams of an example implementation 700 relating to example process 500 shown in FIGS. 5A-5C. FIGS. 7A-7E show an example of PIC-SIP 210 utilizing a substrate fabricated based on process 500 described with respect to FIGS. 5A-5C and FIGS. 6A-6G.

Figure 7A:
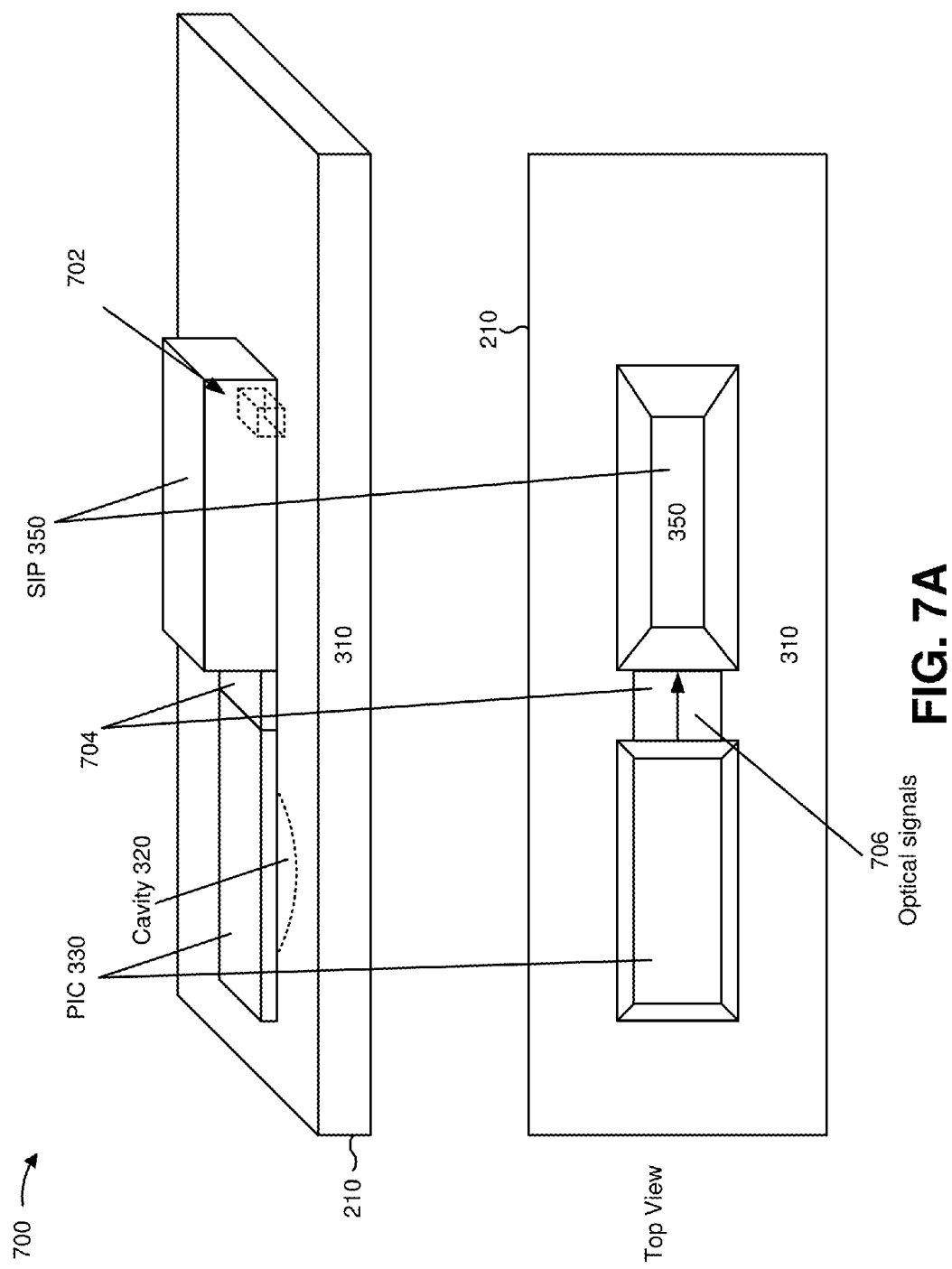

FIG. 7A is diagram illustrating a top-down view of PIC-SIP 210. As shown in FIG. 7A, PIC-SIP 210 includes PIC 330 mounted to substrate 310 to cover cavity 320. SIP 350 includes a SIP substrate that is mounted to substrate 310 (e.g., via wafer bonding). In some implementations, PIC 330 and/or SIP 350 may be flip-chip bonded to substrate 310. Flip-chip bonding may refer to optical devices being mounted on a particular substrate (e.g., a PIC substrate, a SIP substrate, or the like), and the particular substrate being mounted to substrate 310 in an orientation where the optical devices extend from the particular substrate toward substrate 310. For example, optical devices of PIC 330 may extend from a PIC substrate toward substrate 310 and into cavity 320. In another example, PIC 330 and/or SIP 350 may be directly bonded to substrate 310. As shown by reference number 702, a particular optical device of SIP 350 extends from the SIP substrate toward substrate 310. As shown by reference number 704, a layer of amorphous-silicon 704 is attached to substrate 310. As shown by reference number 706, amorphous-silicon 704 fills a gap between PIC 330 and SIP 350 to facilitate optical coupling and a hermetic seal. Similarly, another material, such as silicon dioxide, silicon nitride, silicon oxynitride, or the like may be utilized to facilitate optical coupling and a hermetic seal.

Figure 7B:
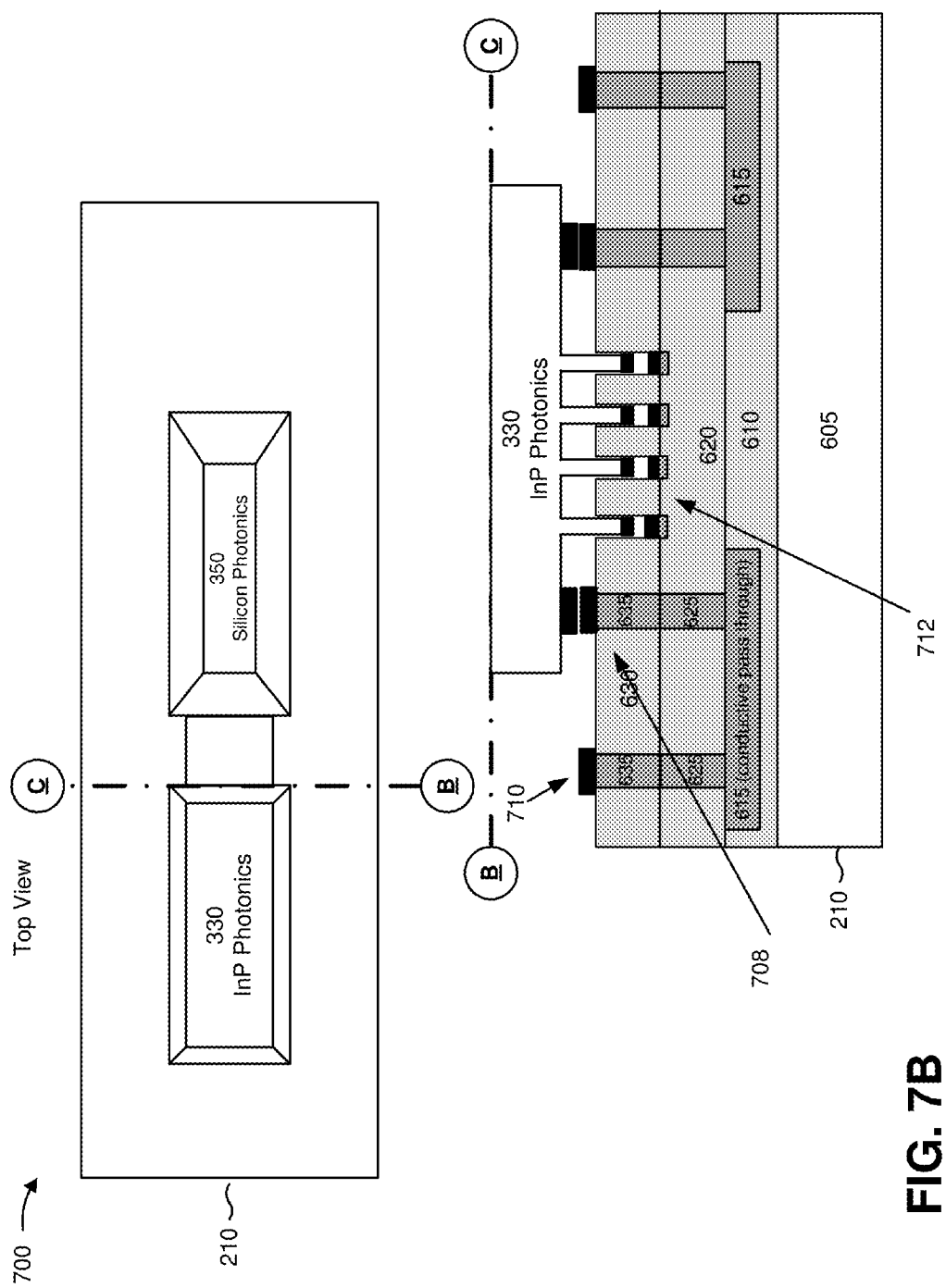

FIG. 7B is a diagram illustrating a first cross-section view of PIC-SIP 210. As shown in FIG. 7B, and by reference number 708, a pad metallization is utilized to connect InP photonics of PIC 330 to conductive pass through 615 of substrate 310. The conductive pass through facilitates an electrical connection from PIC 330 to pad metallization 710 to which another device may connect. As shown by reference number 712, cavity 320 may include multiple grooves into which optical devices of PIC 330 may extend. For example, a set of lasers may extend into the multiple grooves and may transmit optical signals toward SIP 350 via amorphous-silicon 704. In some implementations, optical devices of PIC 330 may connect to pad metallizations formed in the grooves of cavity 320.

Figure 7C:
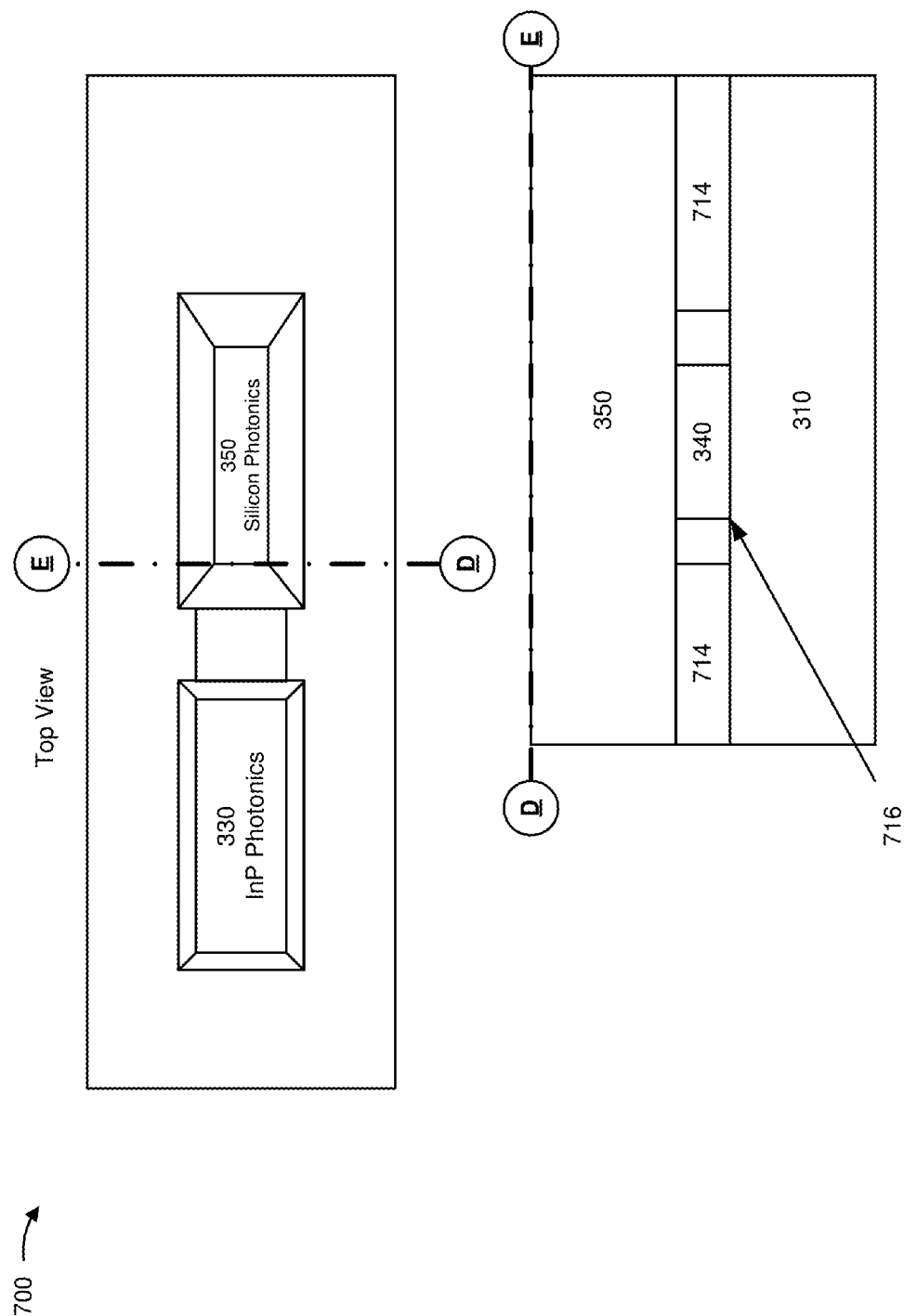

FIG. 7C is a diagram illustrating a second cross-section view of PIC-SIP 210. As shown in FIG. 7C, SIP 350 (e.g., a SIP substrate) is attached to substrate 310 by a wafer-to-wafer bonding technique (e.g., adhesive 714 adheres SIP 350 to substrate 310). As shown by reference number 716, waveguide 340 facilitates transmission of optical signals, received from PIC 330 via amorphous-silicon 704, to optical devices of SIP 350.

In another example, as shown by FIG. 7D in a third cross-section view of PIC-SIP 210, SIP 350 is attached to substrate 310 via metal-to-metal bonding. As shown by reference number 718, a substrate associated with SIP 350 includes a metal portion that is bonded to a metal portion of substrate 310.

Figure 7E:
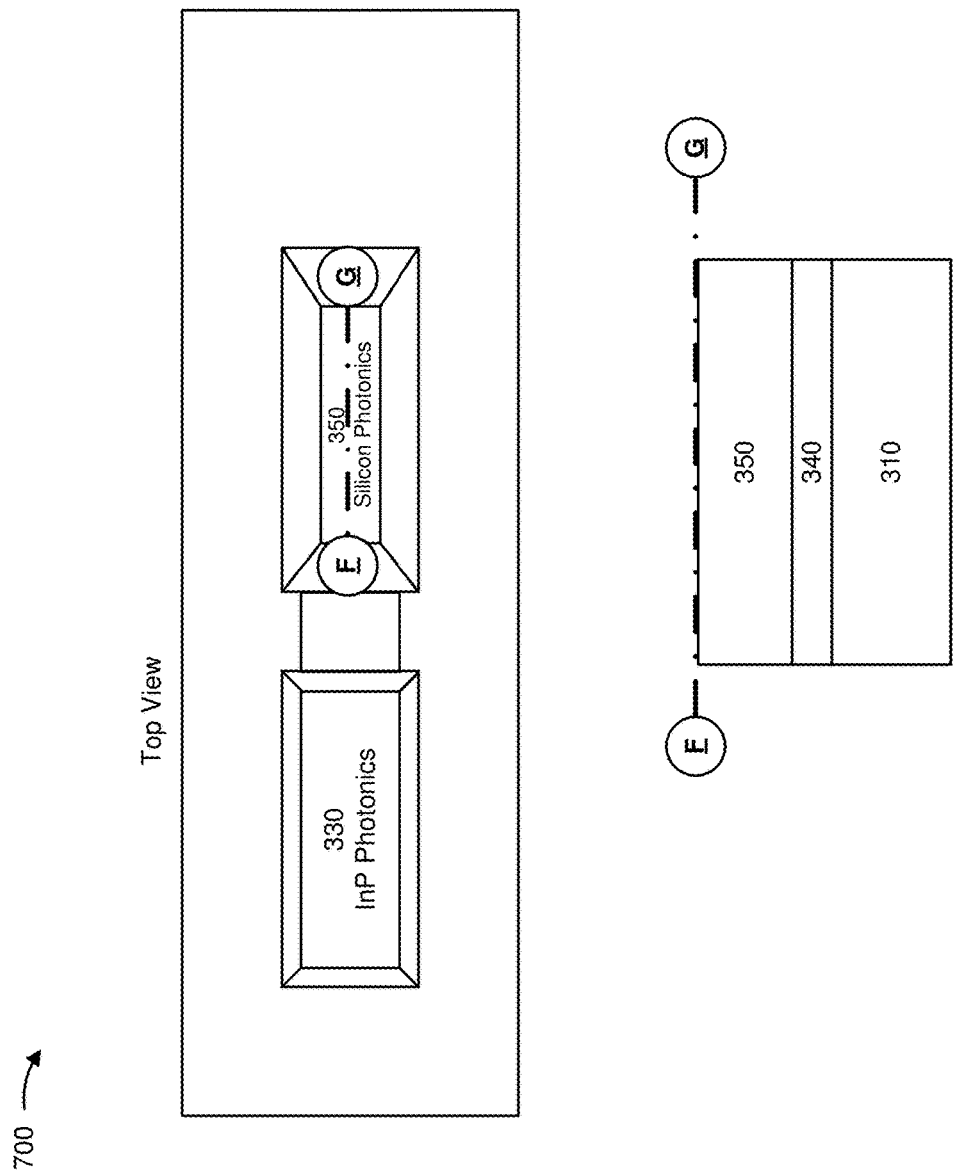

FIG. 7E is a diagram illustrating a fourth cross-section view of PIC-SIP 210. As shown in FIG. 7E, a waveguide extends along a top surface of substrate 310 and below a bottom surface of SIP 350, facilitating directing optical signals to optical devices of SIP 350 mounted to the bottom surface of SIP 350 and extending toward substrate 310.

As indicated above, FIGS. 7A-7E are provided merely as an example. Other examples are possible and may differ from what was described with regard to FIGS. 7A-7E.

FIGS. 8A-8J are diagrams of an example implementation 800 relating to example process 500 shown in FIGS. 5A-5C. FIGS. 8A-8J show an example of fabricating a substrate for PIC-SIP 210 that integrates SIP 350 onto common substrate 310 and utilizes a waveguide approximately at the surface of common substrate 310 to facilitate aligning optical planes of PIC 330 and SIP 350 within approximately three tenths of a micron.

Figure 8A:
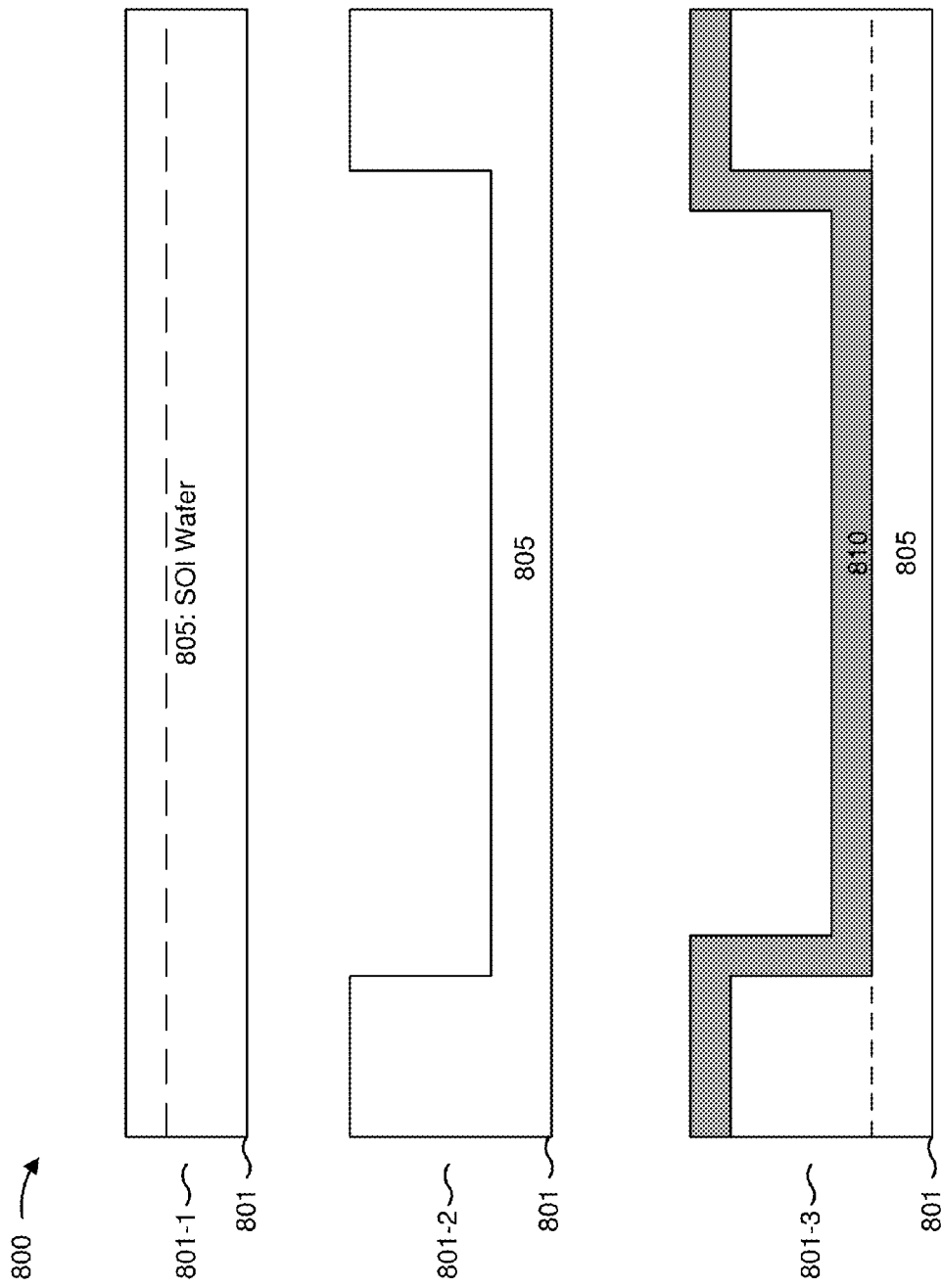

FIG. 8A depicts a substrate portion 801. As shown by reference number 801-1, a substrate 805 is provided for substrate portion 801. For example, a silicon-on-insulator (SOI) wafer is provided. As shown by reference number 801-2, a cavity is etched from substrate 805. As shown by reference number 801-3, a dielectric layer 810 is deposited onto substrate 805, such as by a chemical vapor deposition (CVD) technique. Dielectric layer 810 facilitates dielectric isolation of sidewalls of the cavity etched from substrate 805.

Figure 8B:
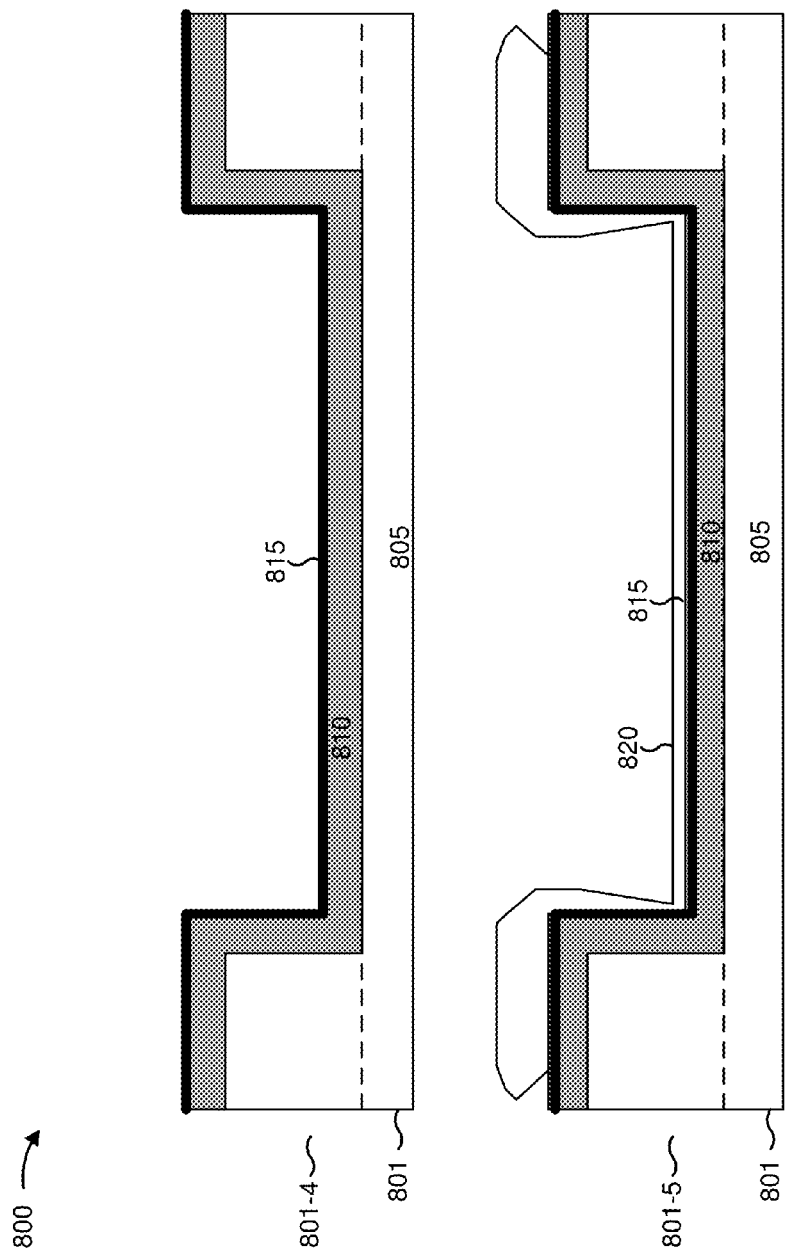

As shown in FIG. 8B, and by reference number 801-4, an adhesive layer 815 is deposited onto dielectric layer 810, such as by a CVD technique. In some implementations, adhesive layer 815 may include a glue associated with facilitating deposition of a metallic layer. As shown by reference number 801-5, a metallic layer 820 is deposited onto adhesive layer 815. In some implementations, an aluminum-based material, which facilitates a dry etching technique, may be selected for metallic layer 820. Additionally, or alternatively, another material may be selected for metallic layer 820.

Figure 8C:
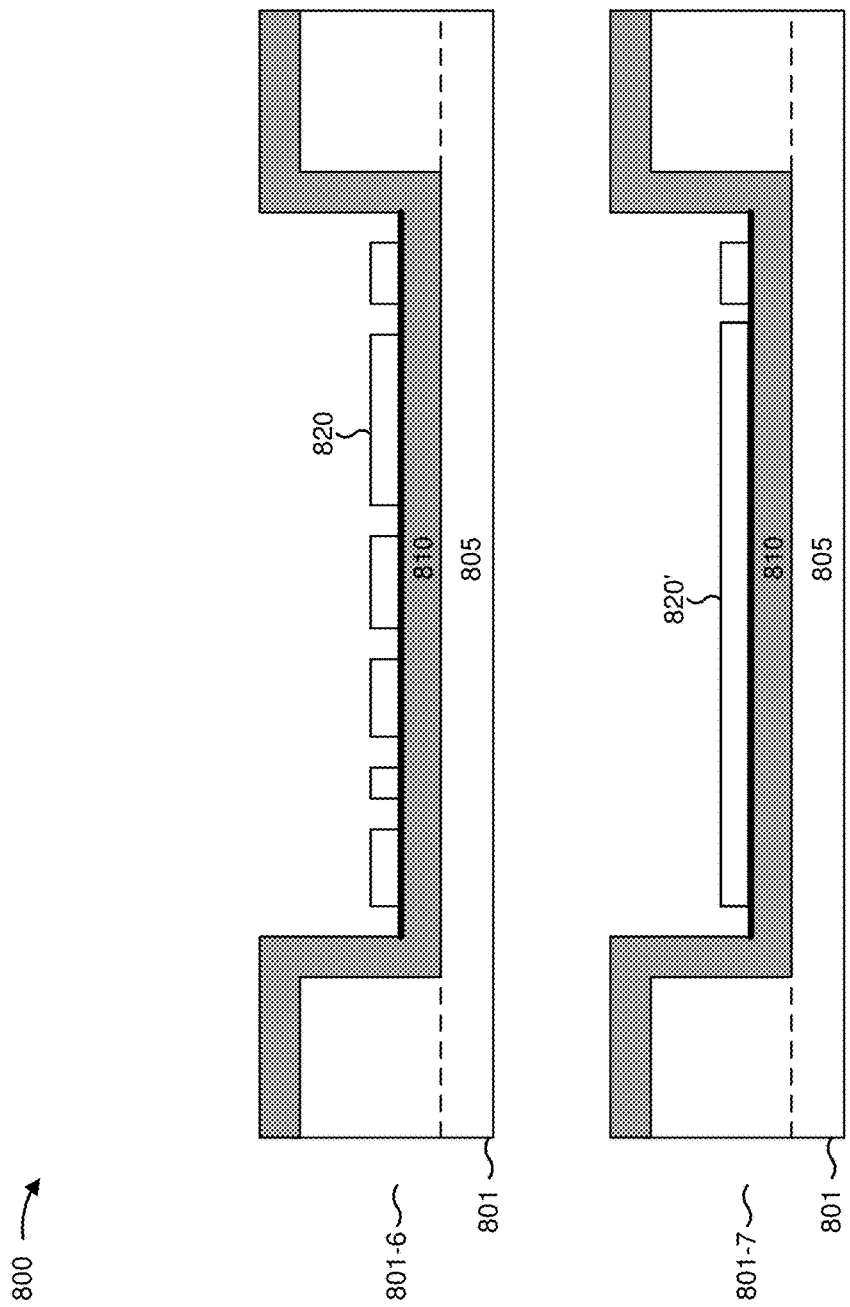

As shown in FIG. 8C, and by reference number 801-6, metallic layer 820 is etched to form a set of metallic traces. As shown by reference number 801-7, metallic layer 820 may be represented in a simplified view as metallic layer 820'.

Figure 8D:
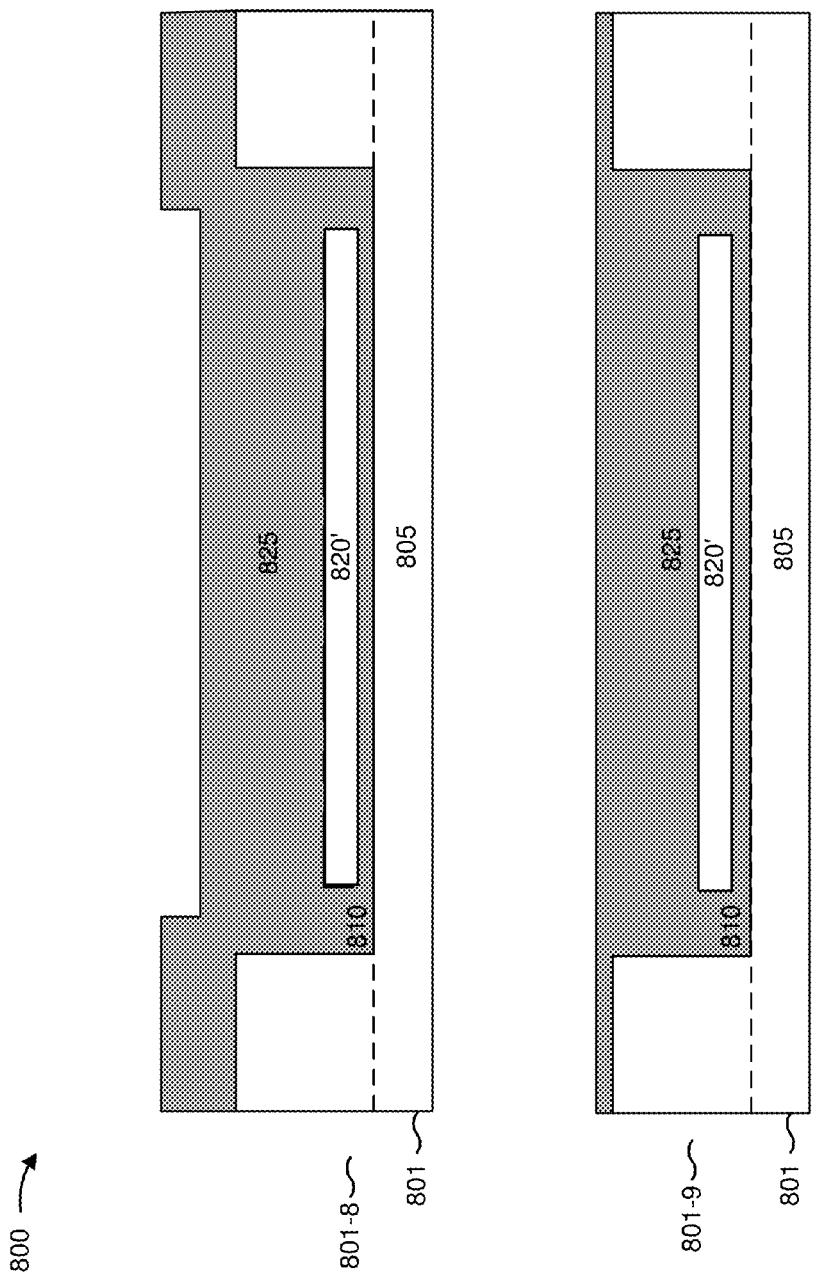

As shown in FIG. 8D, and by reference number 801-8, another dielectric layer 825 is deposited, such as an oxide material based dielectric deposited using a CVD technique. As shown by reference number 801-9, dielectric layer 825 is planarized, such as by a chemical-mechanical polish (CMP) technique. In this way, metallic layer 820' is dielectrically isolated.

Figure 8E:
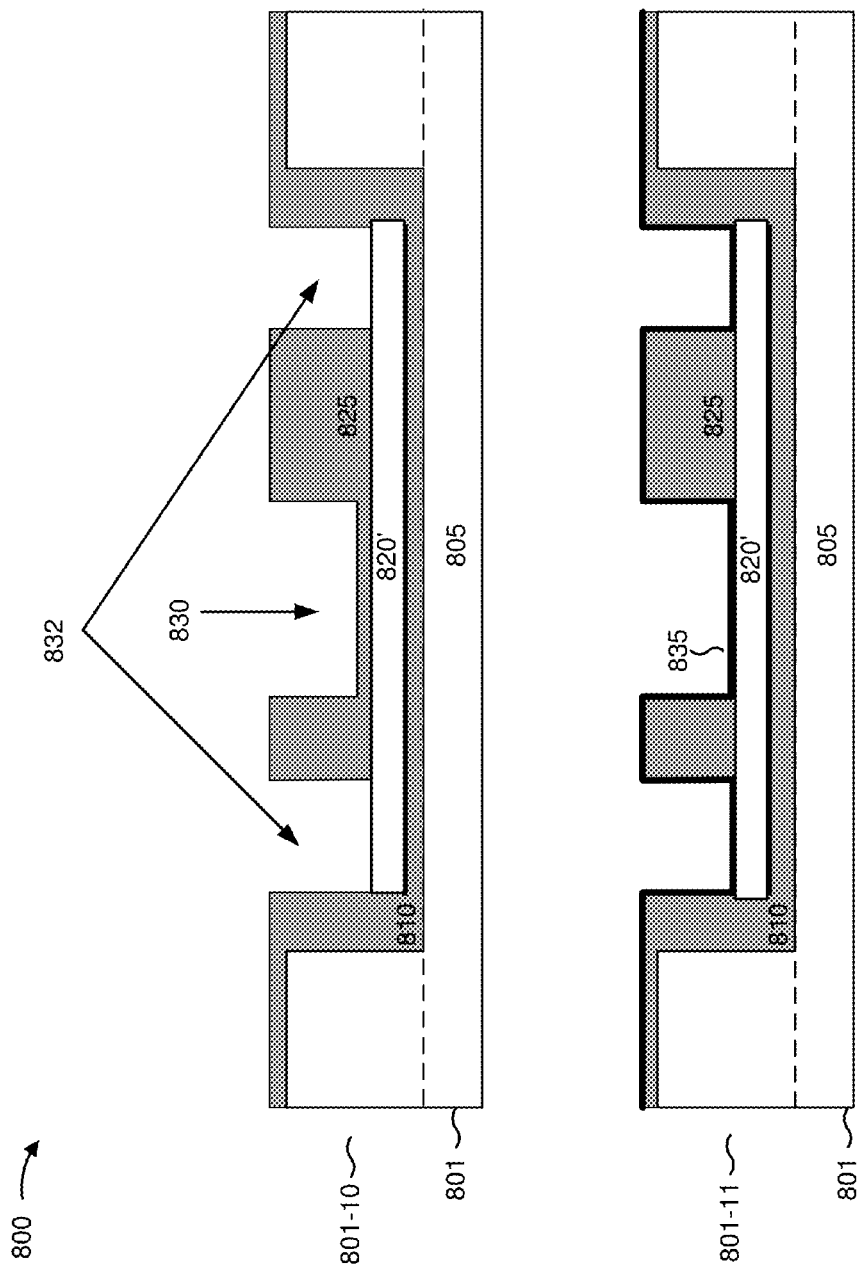

As shown in FIG. 8E, and by reference number 801-10, etching is performed, such as by a reactive-ion etching (RIE) technique. As shown by reference number 830, a cavity is formed in dielectric layer 825. As shown by reference number 832, a set of vias are formed exposing metallic layer 820'. As shown by reference number 801-11, another adhesive layer 835 is deposited facilitating deposition of another metallic layer.

Figure 8F:
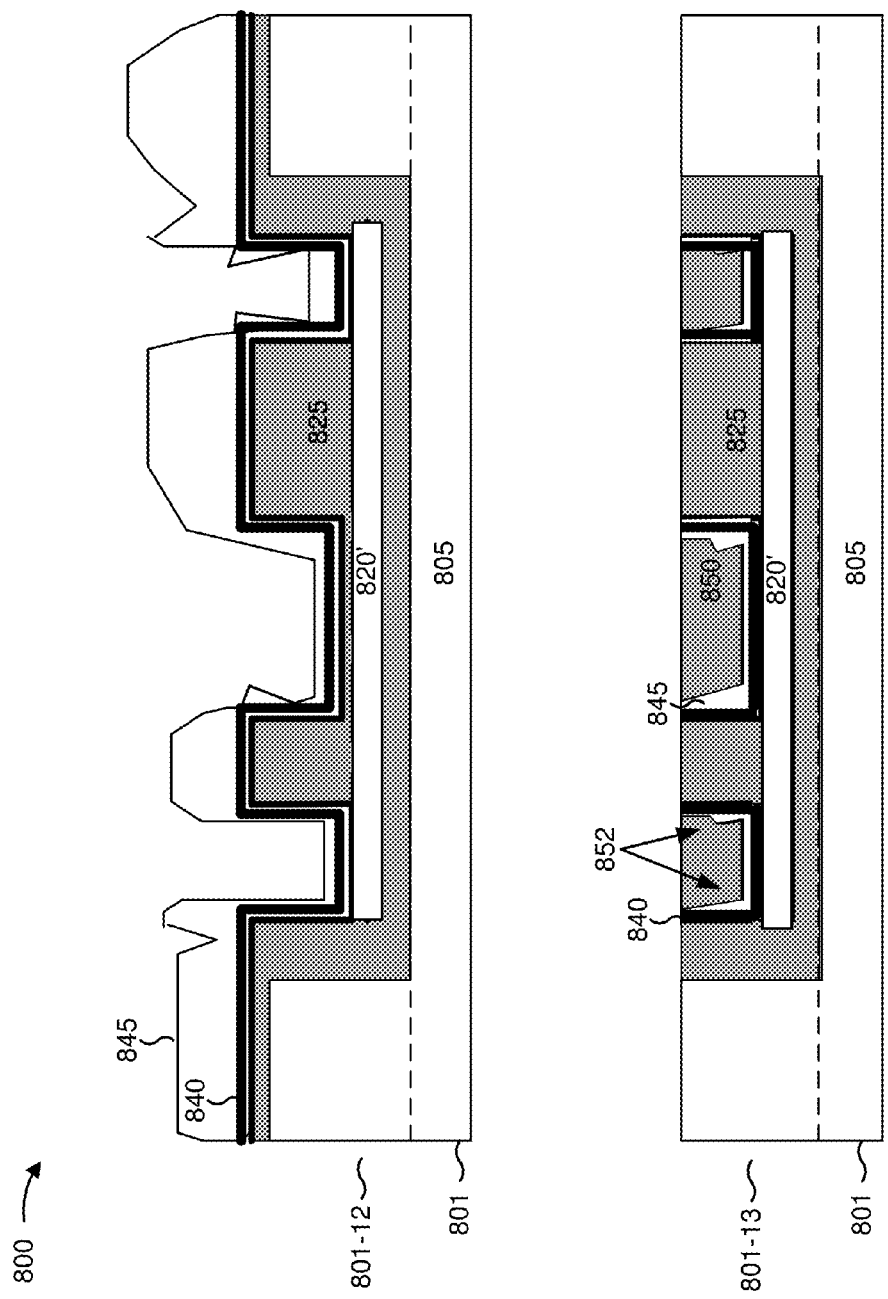

As shown in FIG. 8F, and by reference number 801-12, another metallic layer 840 is deposited and is passivated by an oxide layer 845. For example, a copper plating metallic layer associated with a thickness of less than approximately 0.5 micrometers may be deposited and passivated with oxide. As shown by reference number 801-13, another dielectric layer 850 is deposited and planarized. As shown by reference number 852, interfaces between oxide layer 845 and dielectric layer 850 are non-uniform.

Figure 8G:
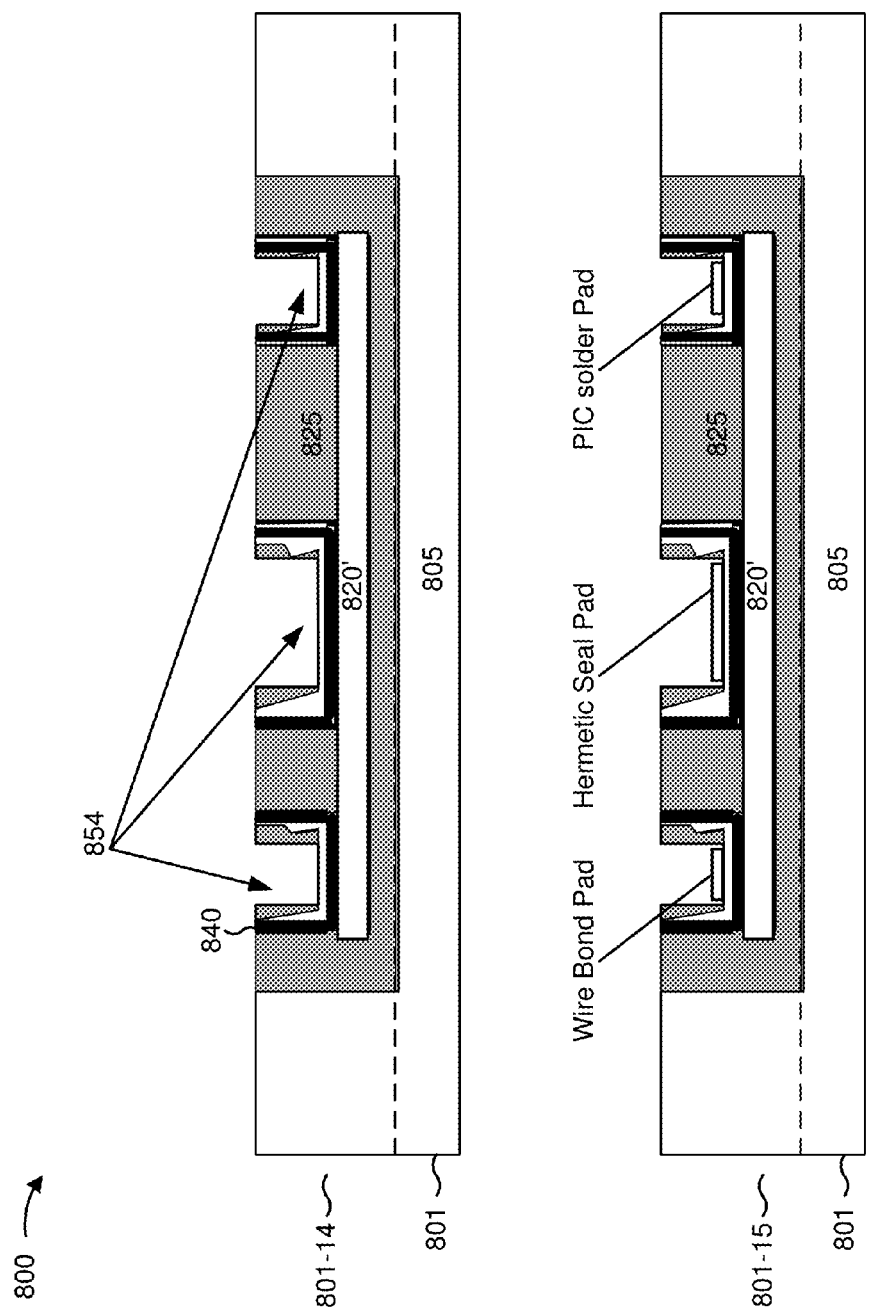

As shown in FIG. 8G, and by reference numbers 801-14 and 854, dielectric layer 850 and oxide layer 845 are etched to expose oxide layer 845 to form uniform dimensions to within a desired tolerance, such as by using an RIE etching technique. As shown by reference number 801-15, a set of metallization pads are deposited, such as by a plating technique. For example, the set of metallization pads include a wire bond pad, a hermetic seal pad, and a PIC solder pad. In some implementations, the set of metallization pads may include an electro-less nickel electro-less palladium immersion gold (ENEPIG) plating metallization pad. Additionally, or alternatively, the set of metallization pads may include an electro-less nickel immersion gold (ENIG) plating metallization pad.

Figure 8H:
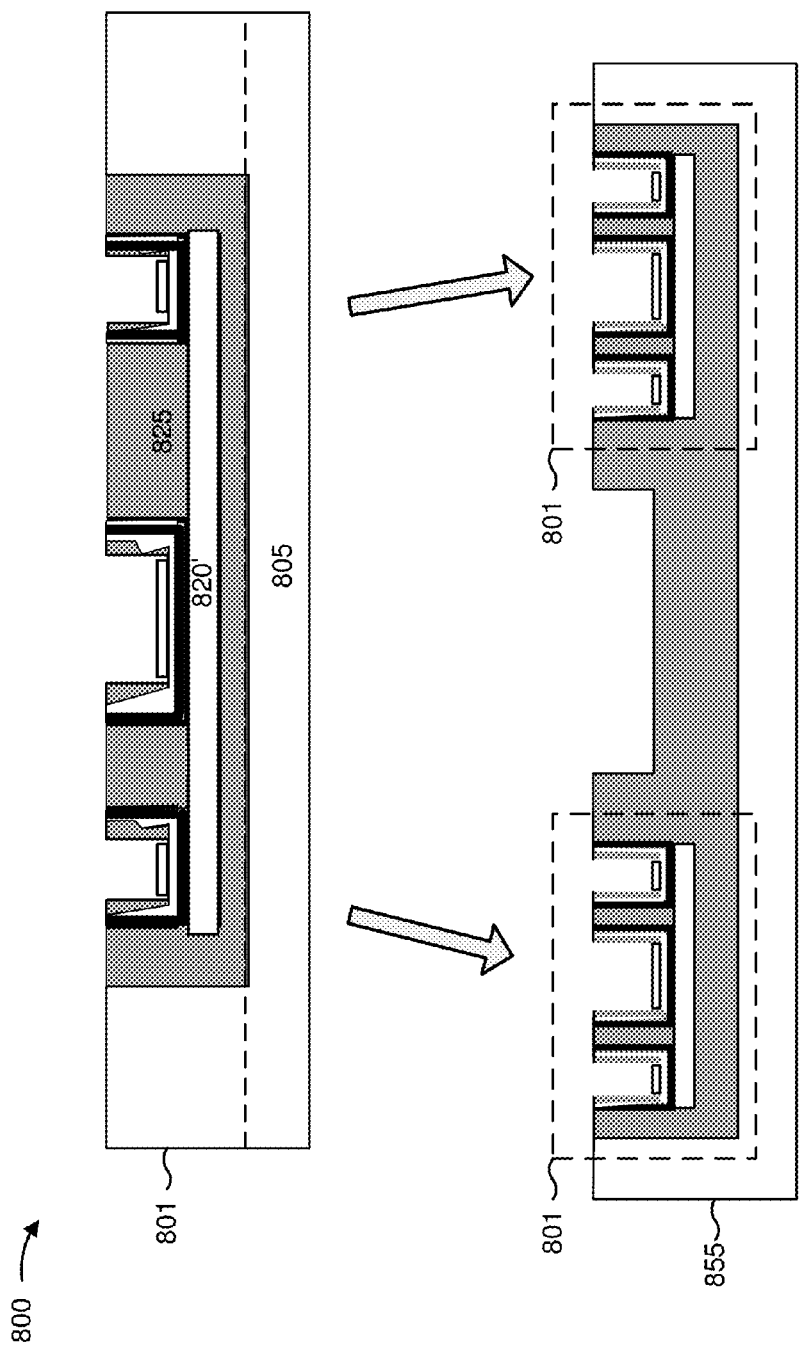

As shown in FIG. 8H, substrate portion 801 may depict a portion of substrate 855.

FIG. 8I is an illustration of substrate 855 (e.g., a cross-section of PIC-SIP 210) in relation to PIC-SIP 210. As shown in FIG. 8I, a first cross-section of PIC-SIP 210, substrate 855-1 illustrates a cavity formed in substrate 855-1 over which PIC 330 is mounted, as shown by reference number 860. As further shown in FIG. 8I, a second cross-section of PIC-SIP 210, substrate 855-2 illustrates a waveguide intersect at which waveguide 340 may receive optical signals from PIC 330 for transmission to SIP 350 (or vice versa), as shown by reference number 865.

Figure 8J:
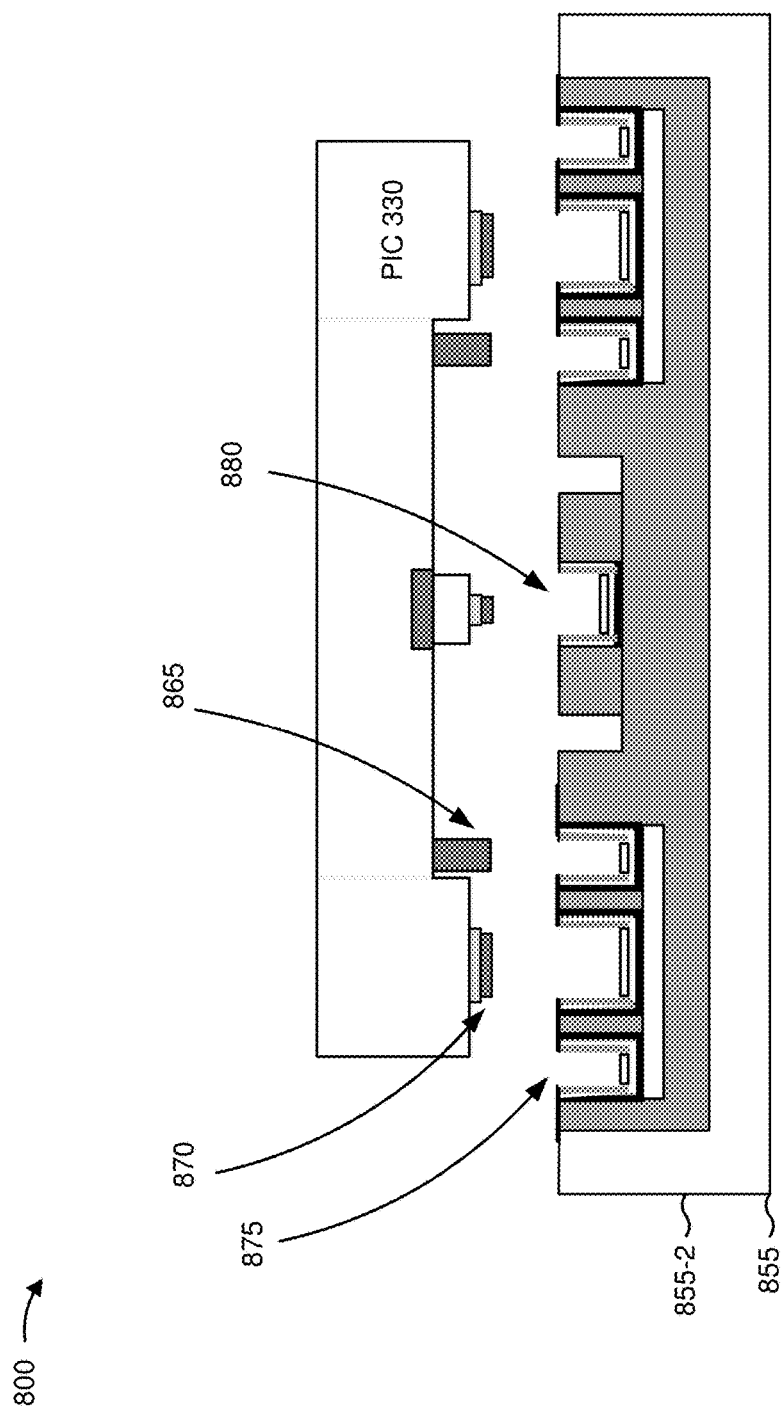

As shown in FIG. 8J, and by reference number 865, an input/output connector of PIC 330 connects to substrate 855 at the PIC solder pad. As shown by reference number 870, a portion of PIC 330 associated with facilitating a hermetic seal (e.g., a flange, a groove, etc.) connects to substrate 855 at the hermetic seal pad. As shown by reference number 875, the wire bond pad remains exposed for connection by another device. As shown by reference number 880, PIC 330 connects at the waveguide intersect for waveguide 340, facilitating a hermetic seal of cavity 320 where waveguide 340 facilitates transmission of optical signals from optical devices of PIC 330 to optical devices of SIP 350 via waveguide 340.

As indicated above, FIGS. 8A-8J are provided merely as an example. Other examples are possible and may differ from what was described with regard to FIGS. 8A-8J.

In this way, a substrate may integrate both PIC circuitry and SIP circuitry while providing optical coupling for the PIC circuitry and SIP circuitry, thermal isolation, and mechanical decoupling.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a first substrate;
   an optical source, the optical source generating light when a voltage or current is applied to the optical source, the optical source being provided on a first region of the first substrate;
   a second substrate,
   a second region of the second substrate forming a cavity with the first region of the first substrate, the optical source extending into the cavity, the first substrate being provided on the second substrate;
   a surface connector provided on a surface of the second substrate;
   an electrical connector provided on a surface of the first substrate;
   wherein the second substrate includes a conductive pass through that electrically connects the surface connector with the electrical connector, the conductive pass through extending beneath a portion of the first substrate and being spaced from the surface of the second substrate; and
   an optical interconnect, the optical interconnect being provided on or in the second substrate and outside the cavity, the optical interconnect being configured to receive the light from the optical source.

2. The device of claim 1, where the cavity is formed from the second substrate based on at least one of:
   selectively etching the second substrate,
   selectively stamping the second substrate,
   selectively ablating material from the second substrate, or
   selectively depositing material onto the second substrate.

3. The device of claim 1, where the cavity is an environmentally sealed cavity.

4. The device of claim 1, where at least one of the first substrate or the second substrate is comprised of at least one of:
   a silicon semiconductor based material,
   an indium-phosphide based material,
   a gallium arsenide based material,
   a fiber reinforced polymer composite based material,
   a polyimide based material,
   a liquid crystal polymer based material,
   a silicon dioxide based material,
   a silicon nitride based material,
   an aluminum nitride based material,
   a beryllium oxide based material, or
   an aluminum oxide based material.

5. The device of claim 1, where the optical source is a laser.

6. The device of claim 1, further comprising:
   a silicon photonics circuit provided on a third region of the second substrate, the silicon photonics circuit being optically coupled to the optical source by the optical interconnect.

7. The device of claim 1, further comprising:
   a photonic integrated circuit (PIC) provided on the first region of the first substrate, the PIC including the optical source.

8. The device of claim 7, where the PIC is provided on the first region of the first substrate via at least one of:
   flip-chip bonding, or
   direct bonding.

9. The device of claim 7, further comprising:
   another PIC provided on a third region of a third substrate, the third substrate being attached to the second substrate.

10. The device of claim 1, where the second region of the second substrate includes a particular material that forms a portion of a hermetic seal for the cavity,
    the particular material including at least one of:
    an epitaxial material,
    an amorphous semiconductor material,
    an amorphous ceramic material, or
    a metal material.

11. The device of claim 1, where the second substrate is comprised of multiple layers of material, the multiple layers of material being selectively patterned to form an electrical interconnect.

12. The device of claim 11, where the multiple layers of material includes at least one of:
    a selectively etched layer,
    a selectively stamped layer,
    a selectively ablated layer, or
    a selectively deposited layer.

13. The device of claim 11, where the second substrate includes an electrical device or an optical device integrated into the multiple layers of material.

14. The device of claim 1, where the optical interconnect includes at least one of:
    an optical butt coupling,
    a waveguide coupling,
    a free space coupling,
    an optical lens, or
    an optical wire bond coupling.

15. A device, comprising:
    a first substrate, the first substrate including one or more waveguides for coupling a first set of optical devices to a second set of optical devices;
    a second substrate, the second substrate being configured to attach to the first substrate and form an environmentally sealed cavity between the first substrate and the second substrate, the second substrate being configured to mount the first set of optical devices;
    a surface connector provided on a surface of the second substrate;
    an electrical connector provided on a surface of the first substrate;
    wherein the second substrate includes a conductive pass through that electrically connects the surface connector with the electrical connector, the conductive pass through extending beneath a portion of the first substrate and being spaced from the surface of the second substrate; and a third substrate, the third substrate being configured to attach to the first substrate, the third substrate being configured to mount the second set of optical devices.

16. The device of claim 15, where the first substrate is further configured to:

facilitate alignment of an output of the first set of optical devices with an input of the second set of optical devices to a tolerance of less than approximately 5 microns.

17. The device of claim 15, where the first set of optical devices are mounted on the second substrate at a location within the environmentally sealed cavity.

18. The device of claim 15, where the environmentally sealed cavity is a hermetically sealed cavity.

19. The device of claim 15, where the one or more waveguides include at least one of:

an inorganic thin film material, or
an organic thin film material.

20. The device of claim 19, where the inorganic thin film material includes at least one of:

an amorphous-silicon based material,
a silicon nitride based material,
a silicon oxide based material,
an indium phosphide based material, or
a gallium arsenide based material.

21. The device of claim 19, where the organic thin film material includes at least one of:

an epoxy based material,
a fiber reinforced epoxy based material,
an organic silicon based material,
a liquid crystal polymer based material,
a photo-definable polymer based material,
a benzocyclobutene based material, or
a polyimide based material.

22. The device of claim 15, where the first substrate is an insulator-based substrate comprised of multiple layers of material, one or more of the multiple layers of material being electrically insulating material,
one or more of the multiple layers of material being electrically conductive material,
the multiple layers of material being patterned to form one or more electrical interconnections.

23. The device of claim 15, where the first substrate further comprises:

a particular waveguide configured to receive optical signal gain for an optical signal associated with the first set of optical devices.

24. The device of claim 15, further comprising:

a set of waveguides attached to the first substrate, the set of waveguides being configured to receive or provide an optical signal to or from another device.

25. A device, comprising:

a first substrate including a cavity in a surface of the first substrate,
the surface of the first substrate being configured to receive a photonic integrated circuit (PIC) provided on a second substrate, the surface of the first substrate being configured to receive silicon photonics (SIP) circuitry;
a sealing structure attached to the first substrate, the sealing structure being configured to facilitate an environmental seal of the cavity with a surface of the second substrate, the sealing structure including one or more openings, such that an optical connection between the PIC with the SIP circuitry passes through said one or more openings;
a surface connector provided on a surface of the second substrate;
an electrical connector provided on the surface of the first substrate;
wherein the second substrate includes a conductive pass through that electrically connects the surface connector with the electrical connector, the conductive pass through extending beneath a portion of the first substrate and being spaced from the surface of the second substrate.

26. The device of claim 25, wherein the optical connection includes one or more waveguides.

27. The device of claim 25, where the surface of the first substrate is configured to receive the SIP circuitry, the SIP circuitry including at least one of:
an optical combiner,
an optical decombiner,
a splitter, or
a modulator.

28. The device of claim 25, where the PIC includes one or more lasers; and where the one or more lasers are mounted on the second substrate at a location within the environmental seal of the cavity.

29. The device of claim 25, where the PIC includes one or more photodetectors; and where the one or more photodetectors are mounted on the second substrate at a location within the environmental seal of the cavity.

30. The device of claim 25, where the environmental seal is a hermetic seal.

31. The device of claim 25, where the sealing structure is configured to attach to the surface of the second substrate via at least one of:

a soft solder connection,
a hard solder connection,
a pure metal connection.

* * * * *